US011945226B2

(12) United States Patent
Takishima et al.

(10) Patent No.: US 11,945,226 B2
(45) Date of Patent: Apr. 2, 2024

(54) LIQUID EJECTING DEVICE AND AIR BLOWING DEVICE

(71) Applicant: SEIKO EPSON CORPORATION, Tokyo (JP)

(72) Inventors: Keigo Takishima, Matsumoto (JP); Hirokazu Fujii, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 113 days.

(21) Appl. No.: 17/809,017

(22) Filed: Jun. 27, 2022

(65) Prior Publication Data

US 2022/0410592 A1 Dec. 29, 2022

(30) Foreign Application Priority Data

Jun. 29, 2021 (JP) ................................ 2021-107562

(51) Int. Cl.

| | |
|---|---|
| ***B41J 2/17*** | (2006.01) |
| ***B41J 11/00*** | (2006.01) |
| ***B41J 29/17*** | (2006.01) |
| ***B41J 29/377*** | (2006.01) |

(52) U.S. Cl.

CPC ......... *B41J 2/1714* (2013.01); *B41J 11/0022* (2021.01); *B41J 29/17* (2013.01); *B41J 29/377* (2013.01)

(58) Field of Classification Search

CPC ...... B41J 2/1714; B41J 11/0022; B41J 29/17; B41J 29/377

See application file for complete search history.

(56) References Cited

U.S. PATENT DOCUMENTS

2015/0202900 A1 7/2015 Sasaki et al.

FOREIGN PATENT DOCUMENTS

| | | | | |
|---|---|---|---|---|
| JP | 2006044021 A | * | 2/2006 | ............. B41J 2/165 |
| JP | 2015-137164 A | | 7/2015 | |

* cited by examiner

*Primary Examiner* — Justin Seo

(74) *Attorney, Agent, or Firm* — WORKMAN NYDEGGER

(57) ABSTRACT

A printer includes an ejecting head that ejects ink, a glued belt including a support surface, a first fan and a second fan configured to blow air toward the support surface, and a facing portion facing a portion of the first fan and a portion of the second fan. The facing portion includes an opening that opens in the Z direction. The opening is located between the first fan and the second fan in the X direction when viewed in the Z direction. When a spacing in the X direction at a first position in the +Y direction is defined as the first spacing and a spacing in the X direction at a second position upstream of the first position in the +Y direction is defined as the second spacing, the second spacing is larger than the first spacing.

10 Claims, 15 Drawing Sheets

LIQUID EJECTING DEVICE AND AIR BLOWING DEVICE

The present application is based on, and claims priority from JP Application Serial Number 2021-107562, filed Jun. 29, 2021, the disclosure of which is hereby incorporated by reference herein in its entirety.

BACKGROUND

1. Technical Field

The present disclosure relates to a liquid ejecting device and an air blowing device.

2. Related Art

A recording device according to JP-A-2015-137164 includes a recording head that ejects ink to a target recording medium, a driving roller that is provided so as to be capable of coming into contact with a first surface of the target recording medium and that imparts feeding force to the first surface, and a fan that is provided at a position facing the driving roller and that is capable of blowing air to a second surface of the target recording medium.

In a configuration such as that of JP-A-2015-137164, when the airflow fed from a fan collides with a surface and thus is diffused in a plurality of directions, and a portion of the airflow flows toward an ejecting head that ejects liquid, then the airflow acts on the ejected liquid and thus may change the flight state of liquid.

SUMMARY

In order to solve the problems described above, a liquid ejecting device according to the present disclosure includes: an ejecting unit configured to eject liquid to a medium to be transported, a support portion including a support surface configured to support the medium, and an air blowing portion configured to blow air to the medium upstream of the ejecting unit in a transport direction of the medium, wherein the air blowing portion includes a first fan configured to blow air toward the support surface, a second fan that is aligned with the first fan in a width direction intersecting the transport direction and that is configured to blow air toward the support surface, and a first facing member that faces the support surface in a height direction intersecting the transport direction and the width direction and that faces a portion of the first fan in the height direction, a second facing member that faces the support surface in the height direction and that faces a portion of the second fan in the height direction, and the second facing member is aligned with the first facing member in the width direction, the first facing member and the second facing member include an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

In order to solve the problems described above, an air blowing device according to the present disclosure includes: a support portion including a support surface configured to support a medium, and an air blowing portion configured to blow air to the medium upstream of an ejecting unit configured to eject liquid to the medium in a transport direction of the medium, wherein the air blowing portion includes a first fan configured to blow air toward the support surface, a second fan that is aligned with the first fan in a width direction intersecting the transport direction and that is configured to blow air toward the support surface, and a facing member that faces the support surface in a height direction intersecting the transport direction and the width direction and that faces a portion of the first fan and a portion of the second fan in the height direction, the facing member includes an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

DESCRIPTION OF EXEMPLARY EMBODIMENTS

Figure 1:
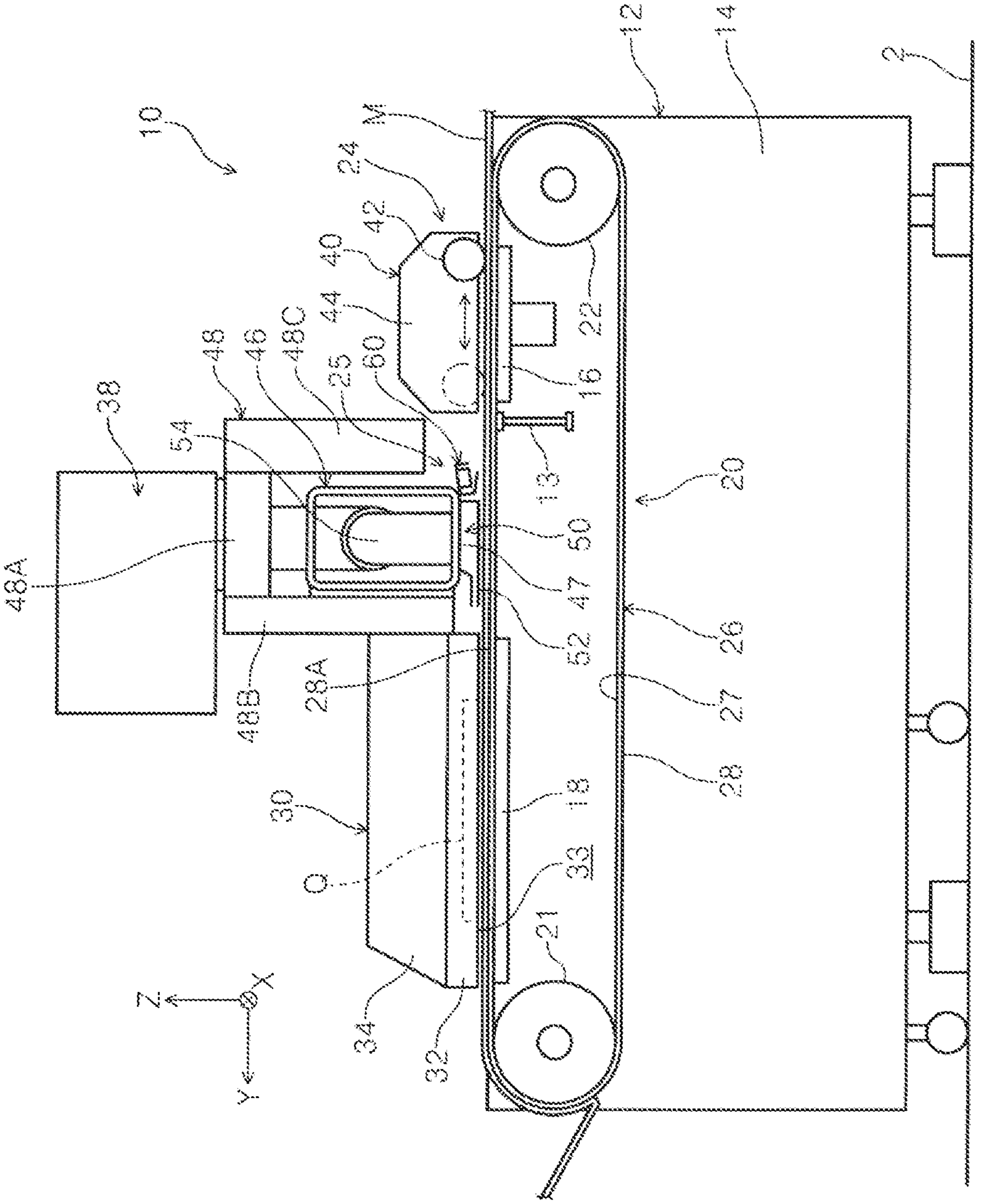
FIG. 1 is a view illustrating an overall configuration of a printer according to an embodiment.

Hereinafter, the present disclosure will be schematically described.

A liquid ejecting device according to a first aspect includes: an ejecting unit configured to eject liquid to a medium to be transported; a support portion including a support surface configured to support the medium; and an air blowing portion configured to blow air to the medium upstream of the ejecting unit in a transport direction of the medium; wherein the air blowing portion includes a first fan configured to blow air toward the support surface, a second fan that is aligned with the first fan in a width direction intersecting the transport direction and that is configured to blow air toward the support surface, and a first facing member that faces the support surface in a height direction intersecting the transport direction and the width direction and that faces a portion of the first fan in the height direction, and a second facing member that faces the support surface in the height direction and that faces a portion of the second fan in the height direction, wherein the second facing member is aligned with the first facing member in the width direction, the first facing member and the second facing member include an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

According to this aspect, in a portion in which the first fan and the second fan do not face the facing member in the height direction, the airflow fed from the first fan and the second fan reaches the medium as is. Accordingly, foreign material such as dust adhering to the medium can be removed by airflow.

The airflow that collided with the medium or the support surface is radially spread from the collision position along the medium or the support surface. Therefore, a portion of the airflow that collided with the medium or the support surface may flow toward the ejecting unit.

Here, when viewed in the height direction, the shape of the opening of the facing member is such that the upstream side in the transport direction is shaped to be more open in the width direction than the downstream side. Thus, a portion of the airflow passing through an edge of the opening toward the medium or the support surface has a direction component intersecting the transport direction.

Further, on the downstream side in the transport direction of the opening, the opening is narrower in the width direction than on the upstream side in the transport direction of the opening, and thus portions of the airflow are more likely collide with each other.

These actions make it possible to cause the airflow passing through the edge of the opening toward the medium or the support surface to function as an air curtain. Thus, the airflow going toward the ejecting unit after colliding with the medium or the support surface can be effectively reduced.

In addition, since the airflow going toward the ejecting unit is reduced, it is possible to suppress changes in the flight state of the liquid ejected from the ejecting unit to the medium.

A liquid ejecting device according to a second aspect is the liquid ejecting device according to the first aspect, wherein the opening includes a first ridge portion and a second ridge portion that face each other in the width direction and that form at least a portion of the opening, the first ridge portion is located within an air blowing range of the first fan in the transport direction when viewed in the height direction, and the second ridge portion is located within an air blowing range of the second fan in the transport direction when viewed in the height direction.

According to this aspect, a portion of each airflow going from the first fan and the second fan toward the width direction can be efficiently utilized as an air curtain compared to a configuration in which the first ridge portion and the second ridge portion are not within the air blowing range of the first fan and within the air blowing range of the second fan in the transport direction.

An air blowing device according to a third aspect is the air blowing device according to the second aspect, wherein the first ridge portion and the second ridge portion are each inclined with respect to the width direction so that the second spacing is larger than the first spacing.

According to this aspect, the first ridge portion and the second ridge portion are each inclined with respect to the width direction so that the second spacing is larger than the first spacing. This makes it possible to continuously reduce the size in the width direction of the opening from upstream to downstream in the transport direction.

A liquid ejecting device according to a fourth aspect is the liquid ejecting device according to the second aspect or the third aspect, wherein the first facing member includes a first facing surface facing the first fan, the second facing member includes a second facing surface facing the second fan, when a direction that intersects the first facing surface and the direction from the first facing member toward the first fan is defined as a first direction, the first facing member is provided with a first extending portion extending from the first ridge portion in the first direction and when a direction that intersects the second facing surface and the direction from the second facing member toward the second fan is defined as a second direction, the second facing member is provided with a second extending portion extending from the second ridge portion in the second direction.

According to this aspect, a portion of the airflow along the facing surface collides with the first extending portion or the second extending portion, and thus goes toward the upper side in the height direction. In addition, the airflow going toward the upper side goes beyond the first extending portion or the second extending portion, and goes toward the lower side in the height direction. In this way, colliding with the first extending portion or the second extending portion causes the direction components of the airflow to be aligned with the component going toward the lower side in the height direction. Thus, even when the distance in the height direction between the facing member and the medium is changed, the direction components of the airflow going toward the medium can be aligned. In addition, since the direction components of the airflow going toward the medium is aligned, it is possible to suppress changes in the flight state of the liquid ejected from the ejecting unit to the medium.

A liquid ejecting device according to a fifth aspect is the liquid ejecting device according to any one of the first aspect to the fourth aspect, wherein the air blowing portion includes a holding portion configured to hold both the first fan and the second fan and the liquid ejecting device comprises a coupling portion configured to couple the holding portion and the facing member so that a position of the facing member relative to the support surface is changeable in accordance with external force.

According to this aspect, the coupling portion couples the holding portion and the facing member so that the position of the facing member relative to the support surface is changeable in accordance with external force. Here, in the operation of setting the medium on the support portion, when the medium or the like comes into contact with the facing member, the position of the facing member relative to the support surface is changed in accordance with acting external force. Accordingly, at least a portion of the facing member can be retracted from the support surface, that is, the spacing between the facing member and the support surface can be widened. Thus, workability in the operation of setting the medium on the support portion can be enhanced.

A liquid ejecting device according to a sixth aspect is the liquid ejecting device according to any one of the first aspect to the fifth aspect and includes: a frame member that is formed of a material having ferromagnetic properties and that is configured to support the ejecting unit; wherein the air blowing portion includes a mounting portion including a permanent magnet, and is attachable to and detachable from the frame member by magnetic force of the permanent magnet.

According to this aspect, since external force greater than the magnetic force of the permanent magnets acts on the mounting portions, the air blowing portion is dismounted from the frame member. Furthermore, the magnetic force of the permanent magnet enables the air blowing portion to be mounted on the frame member. In this way, the air blowing portion can be mounted in a simple configuration.

A liquid ejecting device according to a seventh aspect is the liquid ejecting device according to any one of the first aspect to the sixth aspect, wherein the support portion includes a plurality of rollers that is configured to rotate, and a transport belt that includes the support surface and that is wound around the plurality of rollers, a pressing roller configured to press the medium against the support surface is provided upstream of the ejecting unit in the transport direction, the pressing roller is configured to reciprocate in the transport direction and in a reverse transport direction opposite to the transport direction, and the air blowing portion is provided downstream of the pressing roller and upstream of the ejecting unit in the transport direction.

It has been found that when foreign material such as dust adheres to the surface of the medium, such material is easily separated from the surface after the medium passed through the reciprocating pressing roller.

Here, according to this aspect, to the medium that is in a state in which foreign material is easily separated from the surface, air blowing is performed by the air blowing portion. Thus, the capability to remove foreign material can be further enhanced.

An air blowing device according to an eighth aspect includes: a support portion including a support surface configured to support a medium; and an air blowing portion configured to blow air to the medium upstream of an ejecting unit configured to eject liquid to the medium in a transport direction of the medium; wherein the air blowing portion includes a first fan configured to blow air toward the support surface, a second fan that is aligned with the first fan in a width direction intersecting the transport direction and that is configured to blow air toward the support surface, and a facing member that faces the support surface in a height direction intersecting the transport direction and the width direction and that faces a portion of the first fan and a portion of the second fan in the height direction, the facing member includes an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

According to this aspect, in a portion in which the first fan and the second fan do not face the facing member in the height direction, the airflow fed from the first fan and the second fan reaches the medium as is. Accordingly, foreign material such as dust adhering to the medium can be removed by airflow.

The airflow that collided with the medium or the support surface is radially spread from the collision position along the medium or the support surface. Therefore, a portion of the airflow that collided with the medium or the support surface may flow toward the ejecting unit.

Here, when viewed in the height direction, the shape of the opening of the facing member is such that the upstream side in the transport direction is shaped to be more open in the width direction than the downstream side. Thus, a portion of the airflow passing through an edge of the opening toward the medium or the support surface has a direction component intersecting the transport direction.

Further, on the downstream side in the transport direction of the opening, the opening is narrower in the width direction than on the upstream side in the transport direction of the opening, and thus portions of the airflow are more likely to collide with each other.

These actions make it possible to cause the airflow passing through the edge of the opening toward the medium or the support surface to function as an air curtain. Thus, the airflow going toward the ejecting unit after colliding with the medium or the support surface can be effectively reduced.

An air blowing device according to a ninth aspect is the air blowing device according to the eighth aspect, wherein the opening includes a first ridge portion and a second ridge portion that face each other in the width direction and that form at least a portion of the opening, the first ridge portion is located within an air blowing range of the first fan in the transport direction when viewed in the height direction, and the second ridge portion is located within an air blowing range of the second fan in the transport direction when viewed in the height direction.

According to this aspect, a portion of each airflow going from the first fan and the second fan toward the width direction can be efficiently utilized as an air curtain compared to a configuration in which the first ridge portion and the second ridge portion are not within the air blowing range of the first fan and within the air blowing range of the second fan in the transport direction.

An air blowing device according to a tenth aspect is the air blowing device according to the ninth aspect, wherein the first ridge portion and the second ridge portion are each inclined with respect to the width direction so that the second spacing is larger than the first spacing.

According to this aspect, the first ridge portion and the second ridge portion are each inclined with respect to the width direction so that the second spacing is larger than the first spacing. This makes it possible to continuously reduce the size in the width direction of the opening from upstream to downstream in the transport direction.

Hereinafter, as an embodiment, a printer 10 that is an example of a liquid ejecting device will be specifically described.

FIG. 1 illustrates an overall configuration of the printer 10 installed on a floor 2, which is an example of an installation location. The printer 10 performs recording to a medium M. Examples of the medium M include fabrics and paper. In the present embodiment, a fabric is used as an example of the medium M. Note that the X-Y-Z coordinate system illustrated in each of the drawings is an orthogonal coordinate system.

An exhaust device (not illustrated) is installed on the floor 2. The exhaust device is coupled to an exhaust duct 54 to be described later, and takes in air.

The X direction is an example of the device depth direction of the printer 10. The base end side of an arrow indicating the X direction is defined as the −X direction, and the tip side of the arrow indicating the X direction is defined as the +X direction. Furthermore, the X direction is an example of the width direction.

The Y direction is an example of the device width direction of the printer 10. The tip side of an arrow indicating the Y direction is defined as the +Y direction, and the base end side of the arrow indicating the Y direction is defined as the −Y direction. Furthermore, the +Y direction is an example of the transport direction of the medium M.

The Z direction is an example of the height direction of the printer 10. The Z direction is a direction orthogonal to both the X direction and the Y direction. The tip side of an arrow indicating the Z direction is defined as the +Z direction, and the base end side of the arrow indicating the Z direction is defined as the −Z direction. In the following description, the +Z direction may be referred to as above, and the −Z direction may be referred to as below.

As an example, the printer 10 includes a main body unit 12, a transport unit 20, a recording unit 30, a cleaning unit (not illustrated), a control unit 38, a pressing unit 40, a frame member 46, an intake unit 50, and an air blowing unit 60. Furthermore, as an example, the printer 10 performs ink-jet recording.

The main body unit 12 is configured as a base portion in which each part of the printer 10 is provided. The main body unit 12 includes a main body frame 13 that forms part of the skeleton of the main body unit 12, a side plate 14 mounted on the main body frame 13, a first support frame 16 located in the −Y direction relative to the main body frame 13, and a second support frame 18 located in the +Y direction relative to the main body frame 13.

The first support frame 16 is in contact with the inner circumferential surface 27 of a glued belt 26 to be described later. The first support frame 16 receives the load acting from a pressing roller 42 to be described later, and thus supports the glued belt 26 and the medium M.

The second support frame 18 is in contact with the inner circumferential surface 27. The second support frame 18 is located below an ejecting head 32 to be described later, and supports the glued belt 26 and the medium M.

The transport unit 20 includes a driving roller 21, a driven roller 22, and the glued belt 26. The glued belt 26 is an example of a support portion that supports the medium M.

The driving roller 21 is disposed downstream of the driven roller 22 in the +Y direction. Furthermore, both the driving roller 21 and the driven roller 22 include a rotating shaft along the X direction. Rotation of the driving roller 21 is controlled by the control unit 38 to be described later. The driving roller 21 and the driven roller 22 are examples of a plurality of rollers that is configured to rotate.

The glued belt 26 includes a support surface 28A to be described later. The glued belt 26 is an example of a transport belt wound around the driving roller 21 and the driven roller 22. The glued belt 26 is constituted as an endless belt obtained by joining both ends of an elastic planar plate together. The glued belt 26 moves in a circular manner, and thus can transport the medium M in the +Y direction. In this way, the transport unit 20 can transport the medium M in the +Y direction as the glued belt 26 moves in a circular manner by rotation of the driving roller 21.

As an example, the outer circumferential surface 28 of the glued belt 26 has tackiness, and can support and adsorb the medium M. Tackiness refers to a property of being temporarily adherable to another member and being peelable from the adhesion state.

Of the outer circumferential surface 28, a flat portion located between the driving roller 21 and the driven roller 22 and in the +Z direction is the support surface 28A. In other words, the glued belt 26 includes the support surface 28A capable of supporting the medium M. A portion of the support surface 28A faces the recording unit 30 to be described later in the Z direction.

The cleaning unit 24 (not illustrated) is located downstream of the driving roller 21 in a direction in which the transport belt 17 moves in a circular manner, and cleans the outer circumferential surface 28.

The recording unit 30 is configured to be capable of performing recording to the medium M transported in the +Y direction. Specifically, the recording unit 30 includes an ejecting head 32 as an example of the ejecting unit, and a carriage 34 that supports the ejecting head 32 so as to be capable of reciprocating along the X direction. Furthermore, the recording unit 30 is disposed above the glued belt 26.

The ejecting head 32 includes a plurality of nozzles (not illustrated), and is located above the support surface 28A. The ejecting head 32 is configured to be capable of ejecting ink Q as an example of liquid from the plurality of nozzles to the target recording surface of the medium M, and can perform recording to the medium M. Air can flow through a space 33 between the ejecting head 32 and the support surface 28A or the medium M.

The control unit 28 includes a central processing unit (CPU), a read-only memory (ROM), a random access memory (RAM), and a storage (all not illustrated). The control unit 28 controls the operation of each part of the printer 10.

As an example, the pressing unit 40 includes a pressing roller 42 and a roller support portion 44.

As an example, the pressing roller 42 is a roller in which an elastic portion including silicon rubber is formed on the outer circumferential surface of a core metal that constitutes a shaft portion. The shaft portion (not illustrated) of the pressing roller 42 extends in the X direction. The pressing roller 42 is an example of a pressing member that is provided upstream of the ejecting head 32 in the +Y direction, which is the transport direction of the medium M, and that presses the medium M against the support surface 28A from a position in the +Z direction toward a position in the −Z direction.

The roller support portion 44 includes a bearing portion (not illustrated), and rotatably supports the pressing roller 42. Furthermore, the roller support portion 44 also functions as a linear slider, and causes the shaft portion of the pressing roller 42 to reciprocate in the +Y direction and the −Y direction while the pressing roller 42 remains in contact with the medium M. In other words, the pressing roller 42 is capable of reciprocating in the +Y direction as an example of the transport direction and in the −Y direction as an example of the reverse transport direction opposite to the +Y direction.

Further, operation of a cam (not illustrated) causes the roller support portion 44 to move the pressing roller 42 in a direction away from the support surface 28A and the medium M.

The frame member 46 is provided upstream of the ejecting head 32 and downstream of the pressing roller 42 in the +Y direction. The frame member 46 is formed of a metal containing iron, which is an example of a material having ferromagnetic properties. In the present embodiment, a material having ferromagnetic properties means a material having a relative permeability of 10 or more.

The frame member 46 is constituted as a quadrangular cylindrical member extending in the X direction. The frame member 46 is provided with a sliding portion 48 to be described later. The frame member 46 supports the carriage 34 and the ejecting head 32 via the sliding portion 48.

The exhaust duct 54 to be described later is provided inside the frame member 46.

The lower surface 47 at the bottom of the frame member 46 is a flat surface along the X-Y plane. The lower surface 47 is an example of a frame surface facing the support surface 28A or the medium M in the Z direction. The spacing in the Z direction between the lower surface 47 and the support surface 28A is defined as the spacing d1 (mm) (FIG. 6).

As an example, the sliding portion 48 includes a movable portion 48A that is mounted on the frame member 46 and that is capable of reciprocating in the X direction, an arm portion 48B that is mounted on an end in the +Y direction of the movable portion 48A and that supports the recording unit 30, and a protection portion 48C that is mounted on an end in the −Y direction of the movable portion 48A and that protects wiring and tubes (not illustrated).

As an example, the intake unit 50 includes a lower duct 52, the exhaust duct 54, and an intake fan (not illustrated). The intake unit 50 is provided between the lower surface 47 and the support surface 28A. The intake unit 50 is an example of a spacing change portion that narrows the spacing in the Z direction between the lower surface 47 and the support surface 28A. A space 55 is formed between the intake unit 50 and the support surface 28A.

Figure 6:
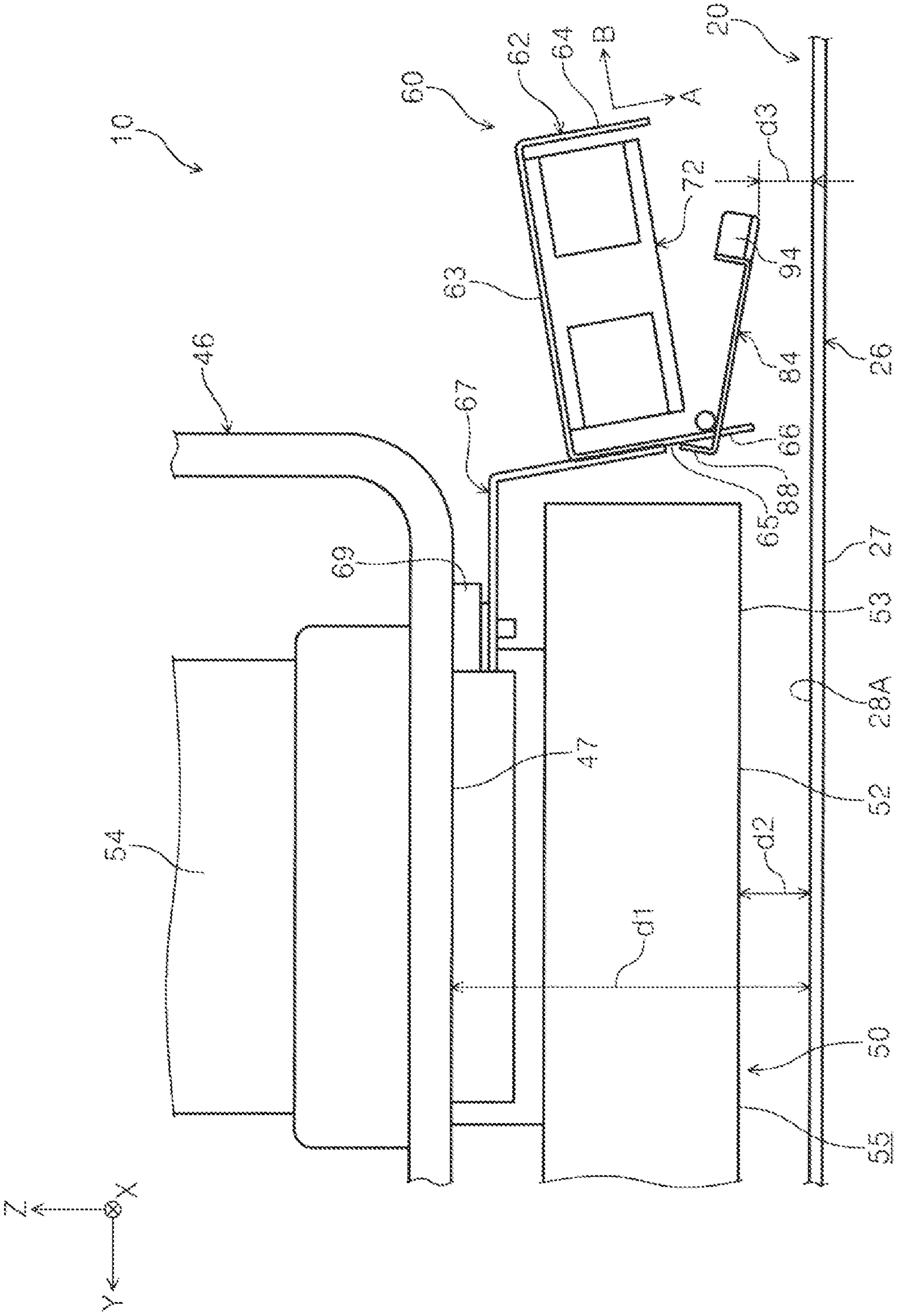
FIG. 6 is a side view illustrating an air blowing unit of a printer according to an embodiment and the periphery of the air blowing unit.

As an example, as illustrated in FIG. 6, the lower duct 52 has a length approximately equal to the length of the glued belt 26 in the X direction. An end in the +Y direction of the lower duct 52 opens toward the ejecting head 32 (FIG. 1). The lower surface 53 at the bottom of the lower duct 52 is a flat surface along the X-Y plane. The lower surface 53 faces the support surface 28A or the medium M in the Z direction. The spacing in the Z direction between the lower surface 53 and the support surface 28A is defined as the spacing d2 (mm). The size of the spacing d2 is smaller than the size of the spacing d1.

The exhaust duct 54 is coupled to the lower duct 52 via the frame member 46. An intake fan (not illustrated) is mounted on one end of the exhaust duct 54.

Figure 13:
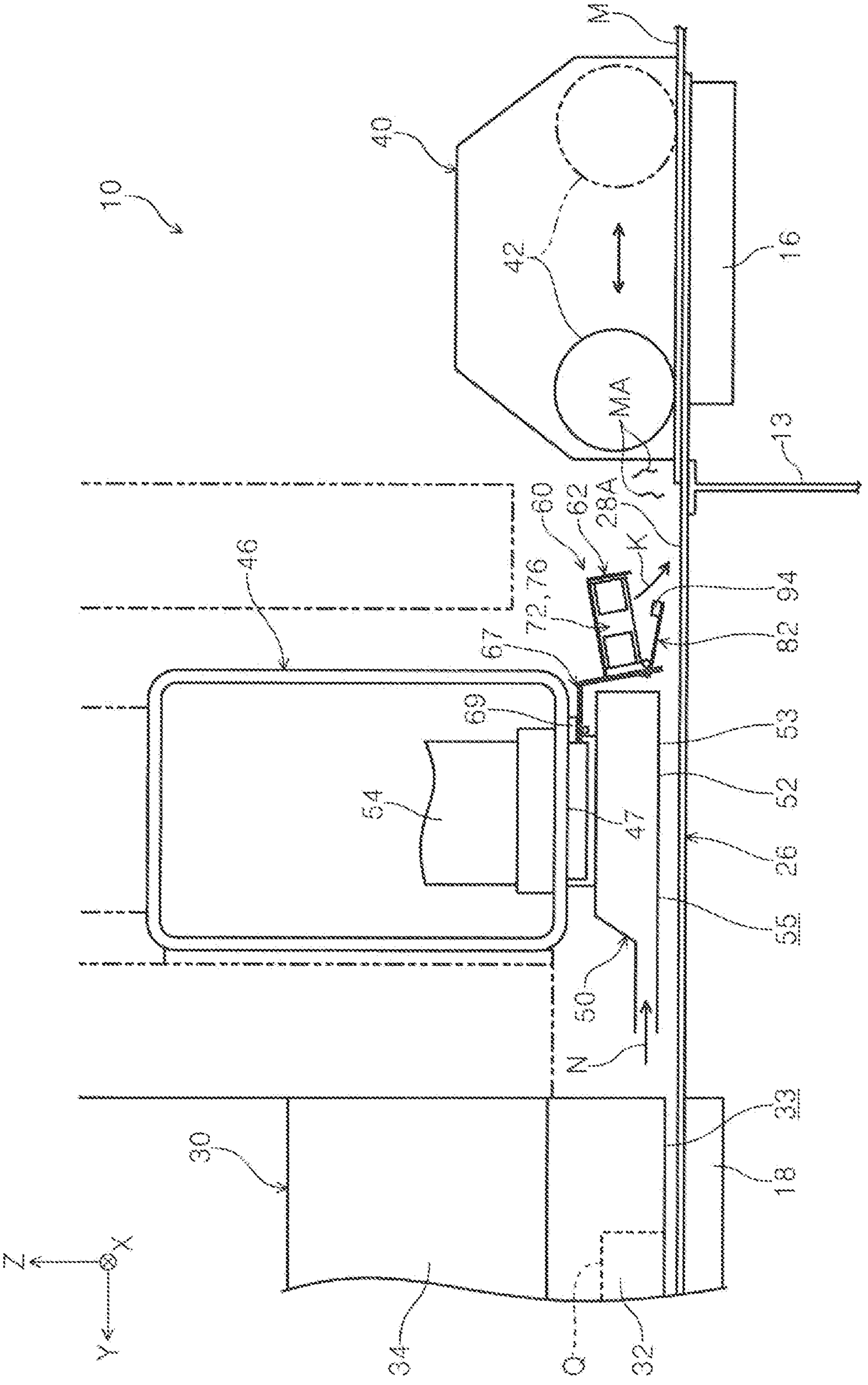
FIG. 13 is a schematic view illustrating a state in which a medium being transported is pressed against a support surface and air blow is performed in a printer according to the present embodiment.

As illustrated in FIG. 1, rotation of an intake fan (not illustrated) causes the intake unit 50 to take in air at the lower duct 52. Mist, dust, or the like stagnating between the ejecting head 32 and the medium M or the support surface 28A is taken in by the intake unit 50. The intake direction in the intake unit 50 is indicated by an arrow N (FIG. 13).

The air blowing unit 60 is an example of an air blowing portion that can blow air to the medium M upstream of the ejecting head 32 in the +Y direction. The air blowing unit 60 is provided downstream of the pressing roller 42 in the +Y direction and upstream of the ejecting head 32 in the +Y direction. Further, the air blowing unit 60 is provided upstream of the frame member 46 in the +Y direction.

Note that in the present embodiment, as an example, the glued belt 26 and the air blowing unit 60 constitute an air blowing device 25. Furthermore, the glued belt 26, the pressing roller 42, the frame member 46, and the air blowing unit 60 constitute a transport device 24.

Figure 2:
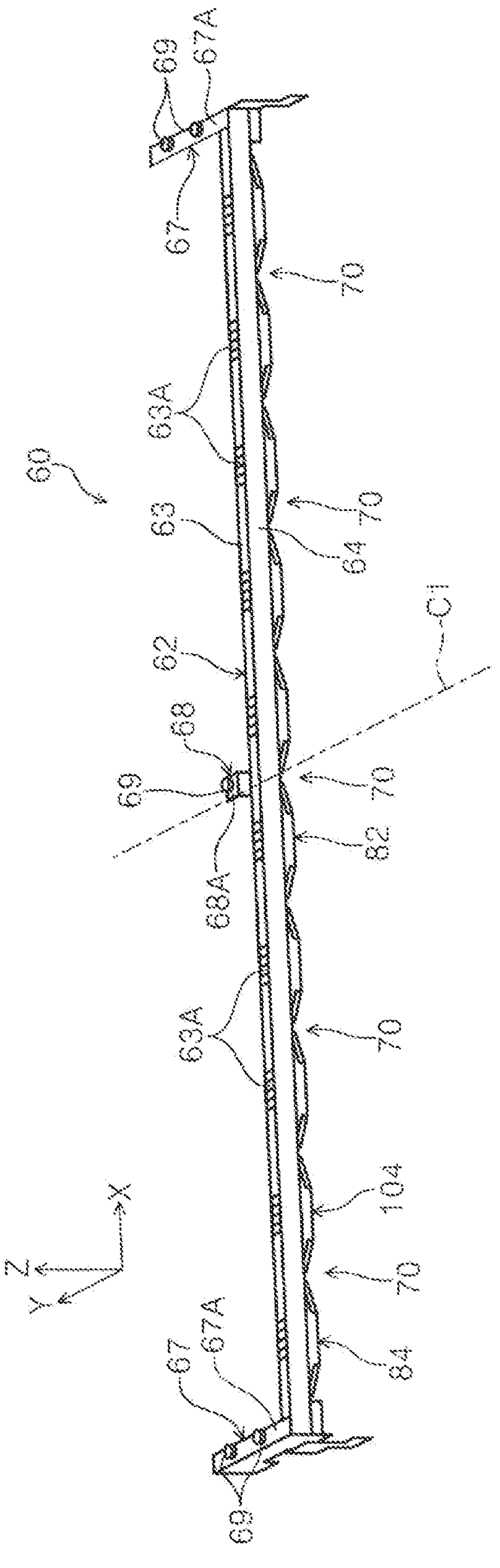
FIG. 2 is a perspective view illustrating an air blowing unit according to an embodiment.

As illustrated in FIG. 2, as an example, the air blowing unit 60 includes a holding frame 62, mounting frames 67, a bracket 68, magnets 69, and five base units 70 aligned in the X direction.

Figure 3:
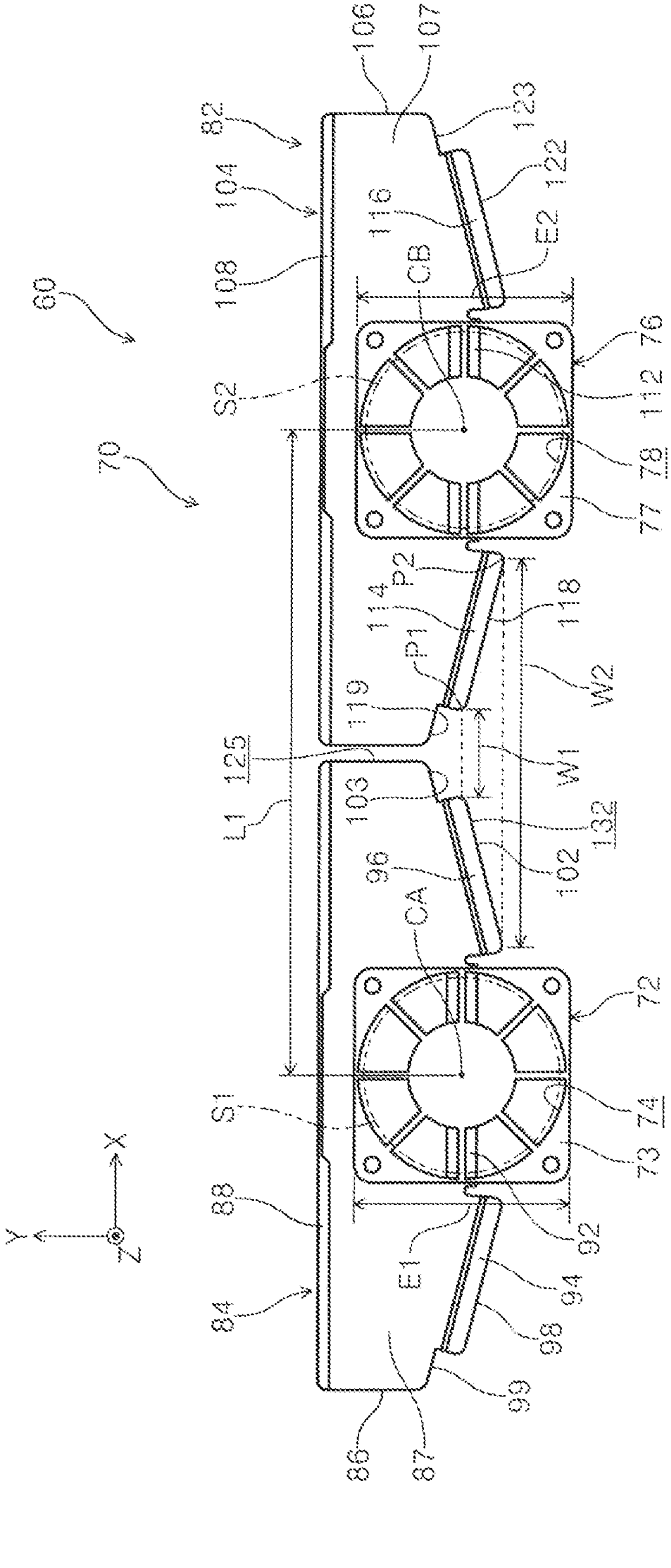
FIG. 3 is a plan view illustrating a base unit of an air blowing unit according to an embodiment.

The holding frame 62 is an example of a holding portion that holds both a first fan 72 and a second fan 76 to be described later (FIG. 3). The holding frame 62 is a member that is long in the X direction. The length in the X direction of the holding frame 62 is longer than the length in the X direction of the glued belt 26 (FIG. 1). An imaginary line passing through the center in the X direction of the holding frame 62 and extending in the Y direction is defined as the center line C1.

As an example, each part of the air blowing unit 60 is configured to be approximately linearly symmetric with respect to the center line C1 in the X direction.

As illustrated in FIG. 6, the holding frame 62 includes an upper wall 63, a front wall 64, and a rear wall 64, and has a U-shaped cross-sectional shape that opens toward a position in the −Y direction and the −Z direction when viewed in the X direction.

In the following description, a direction in which the rotational central axis of each of the first fan 72 and the second fan 76 to be described later (FIG. 3) extends is defined as the A direction. The base end side of an arrow indicating the A direction is defined as the −A direction, and the tip side of the arrow indicating the A direction is defined as the +A direction.

Furthermore, the direction orthogonal to the A direction when viewed in the X direction is defined as the B direction. The base end side of an arrow indicating the B direction is defined as the −B direction, and the tip side of the arrow indicating the B direction is defined as the +B direction.

The upper wall 63 extends in a direction intersecting the +Y direction so that the upstream end in the +Y direction is located in the +Z direction from the downstream end. In the upper wall 63, a plurality of slits 63A (FIG. 2) are provided spaced apart in the X direction. In the upper wall 63, the first fan 72 and the second fan 76 to be described later (FIG. 3) are mounted on the upper wall 63 with screws (not illustrated), and thus are held on the upper wall 63.

The front wall 64 extends from the upstream end in the +Y direction of the upper wall 63 in the A direction.

The rear wall 65 extends from the downstream end in the +Y direction of the upper wall 63 in the A direction. As an example, the length in the A direction of the rear wall 65 is longer than the length in the A direction of the front wall 64. The rear wall 65 is provided with a notch portion 66 that opens in the A direction.

The notch portion 66 is provided in accordance with the positions of a first wind deflecting member 84 and a second wind deflecting member 104 to be described later (FIG. 3).

As illustrated in FIG. 2, the mounting frame 67 extends from both ends in the X direction of the holding frame 62 in the +Y direction. The mounting frame 67 includes an upper surface 67A along the X-Y plane.

The bracket 68 is provided at the center in the X direction of the holding frame 62. The bracket 68 includes an upper surface 68A along the X-Y plane.

The magnets 69 are an example of a mounting portion including a permanent magnet. Five magnets 69 are provided in the mounting frames 67. As an example, the magnets 69 have a predetermined thickness in the Z direction, and have a disk-shaped outer shape. As an example, two magnets 69 are provided on each upper surface 68A, and one magnet 69 is provided on the upper surface 68A. The lower surfaces in the Z direction of the magnets 69 are fixed to the mounting frame 67. The upper surfaces in the Z direction of the magnets 69 are mounted on a portion of the lower surface 47 (FIG. 6) of the frame member 46 by magnetic force. The magnets 69 are dismounted from the frame member 46 when external force greater than the magnetic force acts thereon. In this way, the air blowing unit 60 is attachable to and detachable from the frame member 46 by the magnetic force of the permanent magnet.

Figure 4:
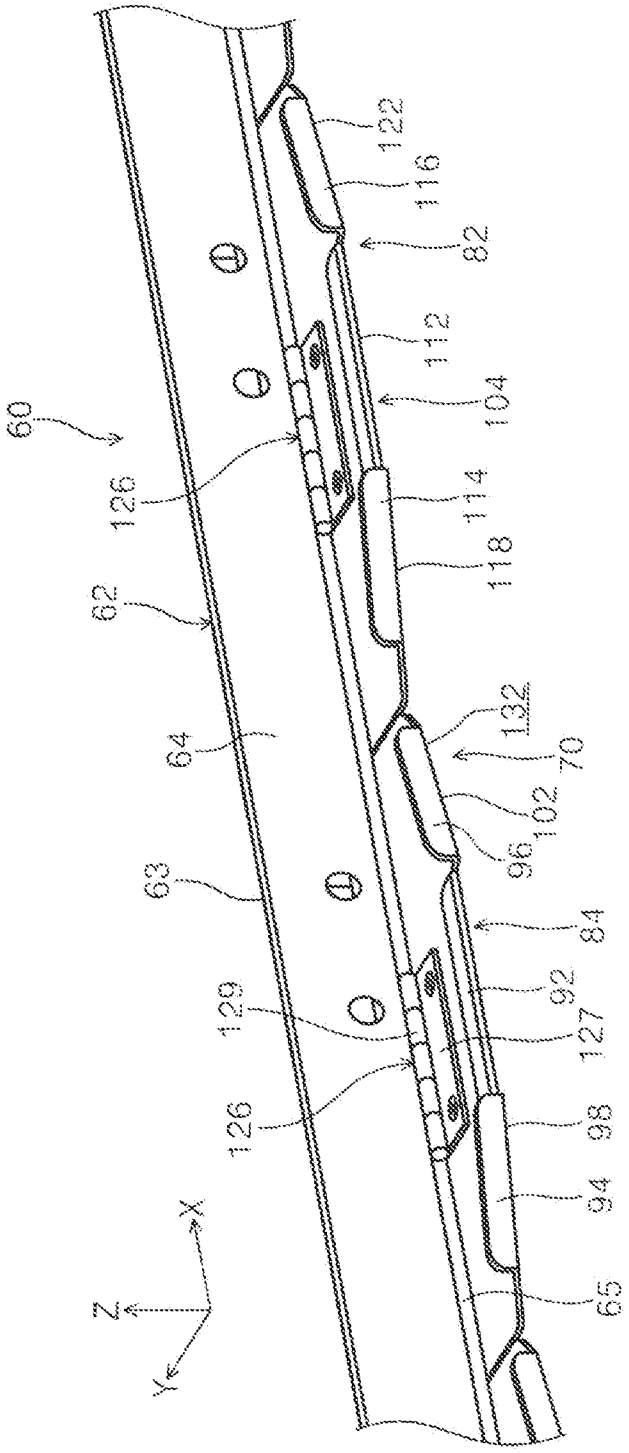
FIG. 4 is a perspective view of a portion of an air blowing unit according to an embodiment.

As illustrated in FIG. 3, as an example, the base unit 70 includes the first fan 72, the second fan 76, a facing portion 82, and two hinge portions 126 (FIG. 4).

The first fan 72 rotates by power supplied from a power source (not illustrated). The control unit 38 (FIG. 1) controls the rotation of the first fan 72. The first fan 72 blows air toward the support surface 28A (FIG. 1).

Specifically, the first fan 72 includes a main body portion 73 and a blade portion (not illustrated). In the main body portion 73, there is formed an outflow port 74 that is an annular hole equally divided into eight in the rotational direction of the blade portion, and that penetrates the main body portion 73 in the A direction. A circular region obtained by connecting the outer circumferential arc of the outflow port 74 is defined as the imaginary air blowing region S1. When the first fan 72 is in operation, an airflow K1 (FIG. 7) is generated inside the air blowing region S1.

The second fan 76 rotates by power supplied from a power source (not illustrated). The control unit 38 (FIG. 1) controls the rotation of the second fan 76. The second fan 76 is aligned with the first fan 72 in the X direction intersecting the +Y direction, and blows air toward the support surface 28A.

Specifically, the second fan 76 includes a main body portion 77 and a blade portion (not illustrated). In the main body portion 77, there is formed an outflow port 78 that is an annular hole equally divided into eight in the rotational direction of the blade portion, and that penetrates the main body portion 77 in the A direction. A circular region obtained by connecting the outer circumferential arc of the outflow port 78 is defined as the imaginary air blowing region S2. When the second fan 76 is in operation, an airflow K8 (FIG. 7) is generated inside the air blowing region S2.

In the present embodiment, as an example, the first fan 72 and the second fan 76 are constituted by a similar member. That is, the first fan 72 and the second fan 76 are made of the same material, have about the same size and mass, and have about the same air blowing capability.

Furthermore, the first fan 72 and the second fan 76 are in a positional relationship in which the first fan 72 and the second fan 76 entirely overlap each other when they are translated in the X direction. A length corresponding to the spacing in the X direction between the rotational center CA of the first fan 72 and the rotational center CB of the second fan 76 is defined as the length Ll.

The facing portion 82 faces the support surface 28A (FIG. 1) in the Z direction intersecting the +Y direction and the X direction. The facing portion 82 is an example of a facing member facing a portion of the first fan 72 and a portion of the second fan 76 in the Z direction. As an example, the portion of the first fan 72 is a site of the first fan 72 that is in the +Y direction from the rotational center CA. As an example, the portion of the second fan 76 is a site of the second fan 76 that is in the +Y direction from the rotational center CB.

As an example, the facing portion 82 includes the first wind deflecting member 84, the second wind deflecting member 104, and an opening 132. The first wind deflecting member 84 is an example of the first facing member. The second wind deflecting member 104 is an example of the second facing member. Furthermore, the facing portion 82 includes facing surfaces 87 and 107 to be described later that face the first fan 72 and the second fan 76, respectively. In other words, the first wind deflecting member 84 includes the facing surface 87, and the second wind deflecting member 104 includes the facing surface 107. The facing surface 87 is an example of the first facing surface. The facing surface 107 is an example of the second facing surface.

Figure 5:
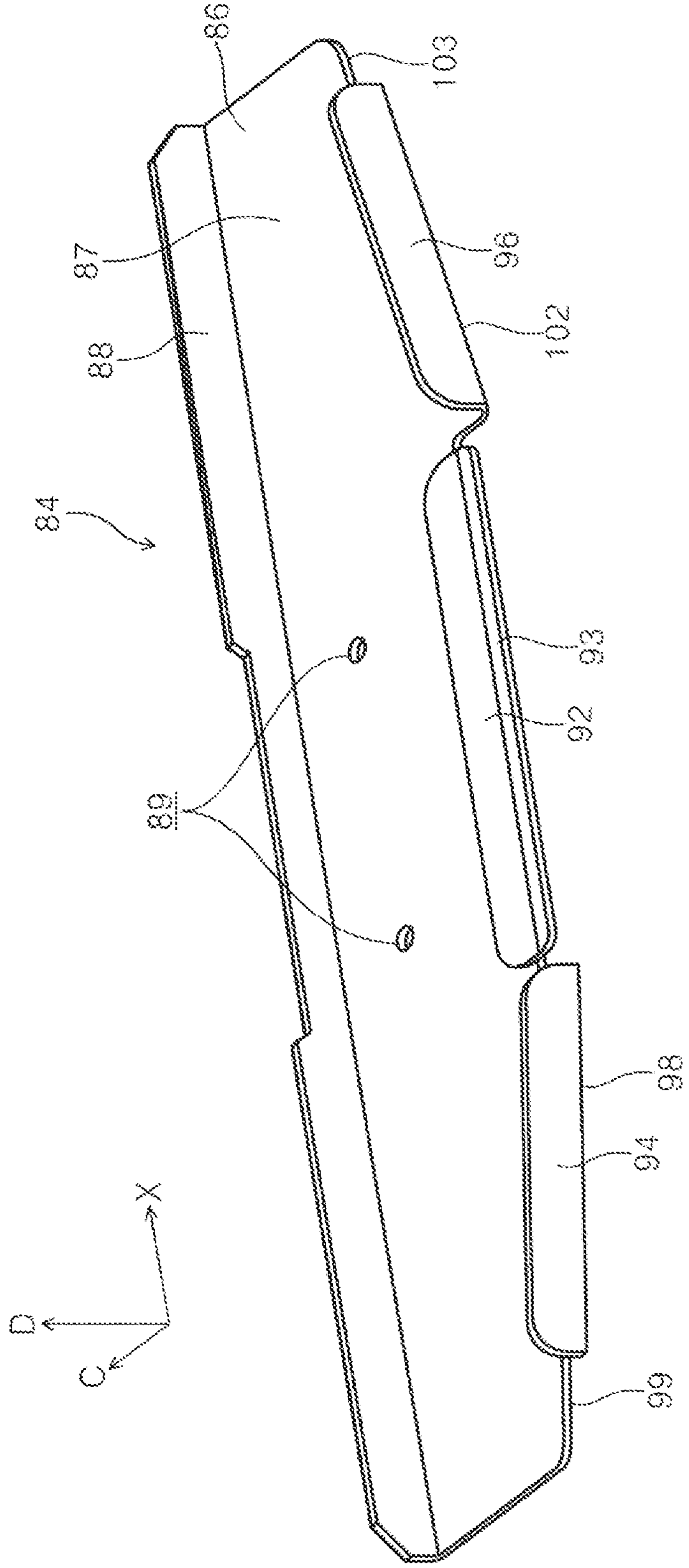
FIG. 5 is a perspective view of a first wind deflecting member of an air blowing unit according to an embodiment.

A direction that intersects the facing surfaces 87 and 107 and that goes from the facing portion 82 toward the first fan 72 and the second fan 76 is defined as the D direction (FIG. 5). Specifically, the D direction includes a D1 direction and a D2 direction. Note that, the D1 direction and the D2 direction are not shown in FIG. 5. The D1 direction is defined as a direction that intersects the facing surface 87 and the direction from the first wind deflecting member 84 toward the first fan 72. The D2 direction is defined as a direction that intersects the facing surface 107 and the direction from the second wind deflecting member 104 toward the second fan 76. The D1 direction is an example of a first direction, and the D2 direction is an example of a second direction. The base end side of an arrow indicating the D direction is defined as the −D direction, and the tip side of the arrow indicating the D direction is defined as the +D direction.

Furthermore, the direction orthogonal to both the X direction and the D direction when viewed in the D direction is defined as the C direction (FIG. 5). The C direction is a direction extending toward a position in the +Y direction and the +Z direction. The base end side of an arrow indicating the C direction is defined as the −C direction, and the tip side of the arrow indicating the C direction is defined as the +C direction.

A spacing in the Z direction between an end in the −C direction of the facing portion 82, which is a site located lowest of the facing portion 82, and the support surface 28A is defined as the spacing d3 (mm) (FIG. 6).

As illustrated in FIG. 5, as an example, the first wind deflecting member 84 includes a bottom plate portion 86, a side plate portion 88, and a folded-back portion 92. Furthermore, the first wind deflecting member 84 is provided with a first extending portion 96 and a second extending portion 94. Further, the first wind deflecting member 84 includes a first ridge portion 102 and a second ridge portion 98. Note that in the present embodiment, as an example, the first wind deflecting member 84 and the second wind deflecting member 104 (FIG. 3) have similar configurations.

The bottom plate portion 86 is formed in a plate shape having a predetermined thickness in the D direction, and extends in the X direction. The bottom plate portion 86 includes the facing surface 87. The facing surface 87 is an end surface in the +D direction of the bottom plate portion 86, and faces the first fan 72 (FIG. 3). Fastening holes 89 for fastening the hinge portions 126 to be described later (FIG. 4) are provided in the bottom plate portion 86.

The side plate portion 88 is upright in the +D direction from an end in the +C direction of the bottom plate portion 86.

The folded-back portion 92 is formed at the central portion in the X direction of an end in the –C direction of the bottom plate portion 86. The folded-back portion 92 is folded back toward the fastening holes 89, and thus is a site thicker than the thickness in the D direction of the bottom plate portion 86. An end surface 93 along the X direction is located at the end in the –C direction of the folded-back portion 92.

The second ridge portion 98 is located in the –X direction relative to the folded-back portion 92 at the end in the –C direction of the bottom plate portion 86. The second ridge portion 98 is adjacent to the folded-back portion 92. The second ridge portion 98 extends in an oblique direction intersecting the X direction so that the end in the +X direction is located in the –C direction relative to the end in the –X direction. An end in the +X direction of the second ridge portion 98 is located in the –C direction from the folded-back portion 92.

At the end in the –C direction of the bottom plate portion 86, a recessed portion 99 is formed in the –X direction relative to the second ridge portion 98. The recessed portion 99 is a site recessed in the +C direction relative to the second ridge portion 98.

The second extending portion 94 is a plate-shaped portion extending from the second ridge portion 98 in the +D direction. The height in the +D direction of the second extending portion 94 is set so as to allow the airflow going toward the –C direction along the facing surface 87 to go beyond the second extending portion 94 and flow in the –C direction.

The first ridge portion 102 is located in the +X direction relative to the folded-back portion 92 at the end in the –C direction of the bottom plate portion 86. The first ridge portion 102 is adjacent to the folded-back portion 92. The first ridge portion 102 extends in an oblique direction intersecting the X direction so that the end in the +X direction is located in the +C direction relative to the end in the –X direction. An end in the –X direction of the first ridge portion 102 is located in the –C direction from the folded-back portion 92.

At the end in the –C direction of the bottom plate portion 86, a recessed portion 103 is formed in the +X direction relative to the first ridge portion 102. The recessed portion 103 is a site recessed in the +C direction relative to the first ridge portion 102.

The first extending portion 96 is a plate-shaped portion extending from the first ridge portion 102 in the +D direction. The height in the +D direction of the first extending portion 96 is set so as to allow the airflow going toward the –C direction along the facing surface 87 to go beyond the first extending portion 96 and flow in the –C direction. Furthermore, as an example, the height in the +D direction of the first extending portion 96 is about the same as the height in the +D direction of the second extending portion 94.

As illustrated in FIG. 3, as an example, the second wind deflecting member 104 includes a bottom plate portion 106, a side plate portion 108, and a folded-back portion 112. Furthermore, the second wind deflecting member 104 is provided with a second extending portion 114 and a first extending portion 116. Further, the second wind deflecting member 104 includes a second ridge portion 118 and a first ridge portion 122. Note that in FIG. 3, the arrow for the C direction and the arrow for the D direction are omitted.

The bottom plate portion 106 is formed in a plate shape having a predetermined thickness in the D direction, and extends in the X direction. The bottom plate portion 106 includes a facing surface 107. The facing surface 107 is an end surface in the +D direction of the bottom plate portion 106, and faces the second fan 76. Fastening holes (not illustrated) for fastening the hinge portions 126 to be described later (FIG. 4) are provided in the bottom plate portion 106.

The side plate portion 108 is upright in the +D direction from an end in the +C direction of the bottom plate portion 106.

The folded-back portion 112 is formed at the central portion in the X direction of an end in the –C direction of the bottom plate portion 106. The folded-back portion 112 is folded back toward the fastening holes, and thus is a site thicker than the thickness in the D direction of the bottom plate portion 106.

The second ridge portion 118 is located in the –X direction relative to the folded-back portion 112 at the end in the –C direction of the bottom plate portion 106. The second ridge portion 118 is adjacent to the folded-back portion 112. The second ridge portion 118 extends in an oblique direction intersecting the X direction so that an end in the +X direction is located in the –C direction relative to an end in the –X direction. The end in the +X direction of the second ridge portion 118 is located in the –C direction from the folded-back portion 112.

At the end in the –C direction of the bottom plate portion 106, a recessed portion 119 is formed in the –X direction relative to the second ridge portion 118. The recessed portion 119 is a site recessed in the +C direction relative to the second ridge portion 118.

The second extending portion 114 is a plate-shaped portion extending from the second ridge portion 118 in the +D direction. The height in the +D direction of the second extending portion 114 is set so as to allow the airflow going toward the –C direction along the facing surface 107 to go beyond the second extending portion 114 and flow in the –C direction.

The first ridge portion 122 is located in the +X direction relative to the folded-back portion 112 at the end in the –C direction of the bottom plate portion 106. The first ridge portion 122 is adjacent to the folded-back portion 112. The first ridge portion 122 extends in an oblique direction intersecting the X direction so that an end in the +X direction is located in the +C direction relative to an end in the –X direction. The end in the –X direction of the first ridge portion 122 is located in the –C direction from the folded-back portion 112.

At the end in the –C direction of the bottom plate portion 106, a recessed portion 123 is formed in the +X direction relative to the first ridge portion 122. The recessed portion 123 is a site recessed in the +C direction relative to the first ridge portion 122.

The first extending portion 116 is a plate-shaped portion extending from the first ridge portion 122 in the +D direction. The height in the +D direction of the first extending portion 116 is set so as to allow the airflow going toward the −C direction along the facing surface 107 to go beyond the first extending portion 116 and flow in the −C direction. Furthermore, as an example, the height in the +D direction of the first extending portion 116 is about the same as the height in the +D direction of the second extending portion 114.

The bottom plate portion 86 and the bottom plate portion 106 are located spaced apart in the X direction. That is, a gap 125 is formed between the first wind deflecting member 84 and the second wind deflecting member 104. The gap 125 is a space extending in the Y direction, and allows air, which is an example of gas, to flow through.

The positions of the first wind deflecting member 84 and the second wind deflecting member 104 in the Y direction are aligned with each other.

The opening 132 is a space formed by the first wind deflecting member 84 and the second wind deflecting member 104, and is a site that opens in the Z direction. The opening 132 is located between the first fan 72 and the second fan 76 in the X direction when viewed in the Z direction, and has a shape in which the portion located upstream in the +Y direction is more widely open in the X direction than the portion located downstream. That is, as an example, the opening 132 is configured in a trapezoid shape in which the upper bottom is located in the +Y direction and the lower bottom is located in the −Y direction when viewed in the Z direction. In addition, the site corresponding to the upper bottom and the site corresponding to the lower bottom are open in the Y direction.

Specifically, the opening 132 includes the first ridge portion 102 and the second ridge portion 118 that face each other in the X direction. The first ridge portion 102 of the first wind deflecting member 84 and the second ridge portion 118 of the second wind deflecting member 104 constitute the oblique sides of the trapezoid described above. In other words, the first ridge portion 102 and the second ridge portion 118 constitute at least a portion of the opening 132.

The first ridge portion 102 is located within an air blowing range E1 of the first fan 72 in the +Y direction when viewed in the Z direction. The air blowing range E1 is a range that includes positions from the end in the −Y direction through to the end in the +Y direction of the air blowing region S1 in the Y direction. Being located within the air blowing range E1 means that the air blowing range E1 and the first ridge portion 102 overlap each other when viewed in the X direction.

The second ridge portion 118 is located within an air blowing range E2 of the second fan 76 in the +Y direction when viewed in the Z direction. The air blowing range E2 is a range that includes positions from the end in the −Y direction through to the end in the +Y direction of the air blowing region S2 in the Y direction. Being located within the air blowing range E2 means that the air blowing range E2 and the second ridge portion 118 overlap each other when viewed in the X direction.

Of the positions in the Y direction, the position of the end in the +Y direction of the second ridge portion 118 and the position of the end in the +Y direction of the first ridge portion 102 are defined as the first positions P1. The spacing in the X direction between the second ridge portion 118 and the first ridge portion 102 at the first positions P1 in the +Y direction is defined as the first spacing W1 (mm).

Of the positions in the Y direction, the position of the end in the −Y direction of the second ridge portion 118 and the position of the end in the −Y direction of the first ridge portion 102 are defined as the second positions P2. That is, the second positions P2 are located upstream of the first positions P1 in the +Y direction. The spacing in the X direction between the second ridge portion 118 and the first ridge portion 102 at the second positions P2 is defined as the second spacing W2 (mm).

The second ridge portion 118 and the first ridge portion 102 are each inclined in the X direction so that the second spacing W2 is larger than the first spacing W1.

In other words, when the spacing in the X direction of the opening 132 at the first positions P1 in the +Y direction is defined as the first spacing W1, and the spacing in the X direction of the opening 132 at the second positions P2 upstream of the first positions P1 in the +Y direction is defined as the second spacing W2, the second spacing W2 is larger than the first spacing W1.

As illustrated in FIG. 4, the hinge portions 126 are provided in the air blowing unit 60. The hinge portions 126 are an example of a coupling portion that couples the holding frame 62 and the facing portion 82 so that the position of the facing portion 82 relative to the support surface 28A (FIG. 1) is changeable in accordance with external force.

Figure 9:
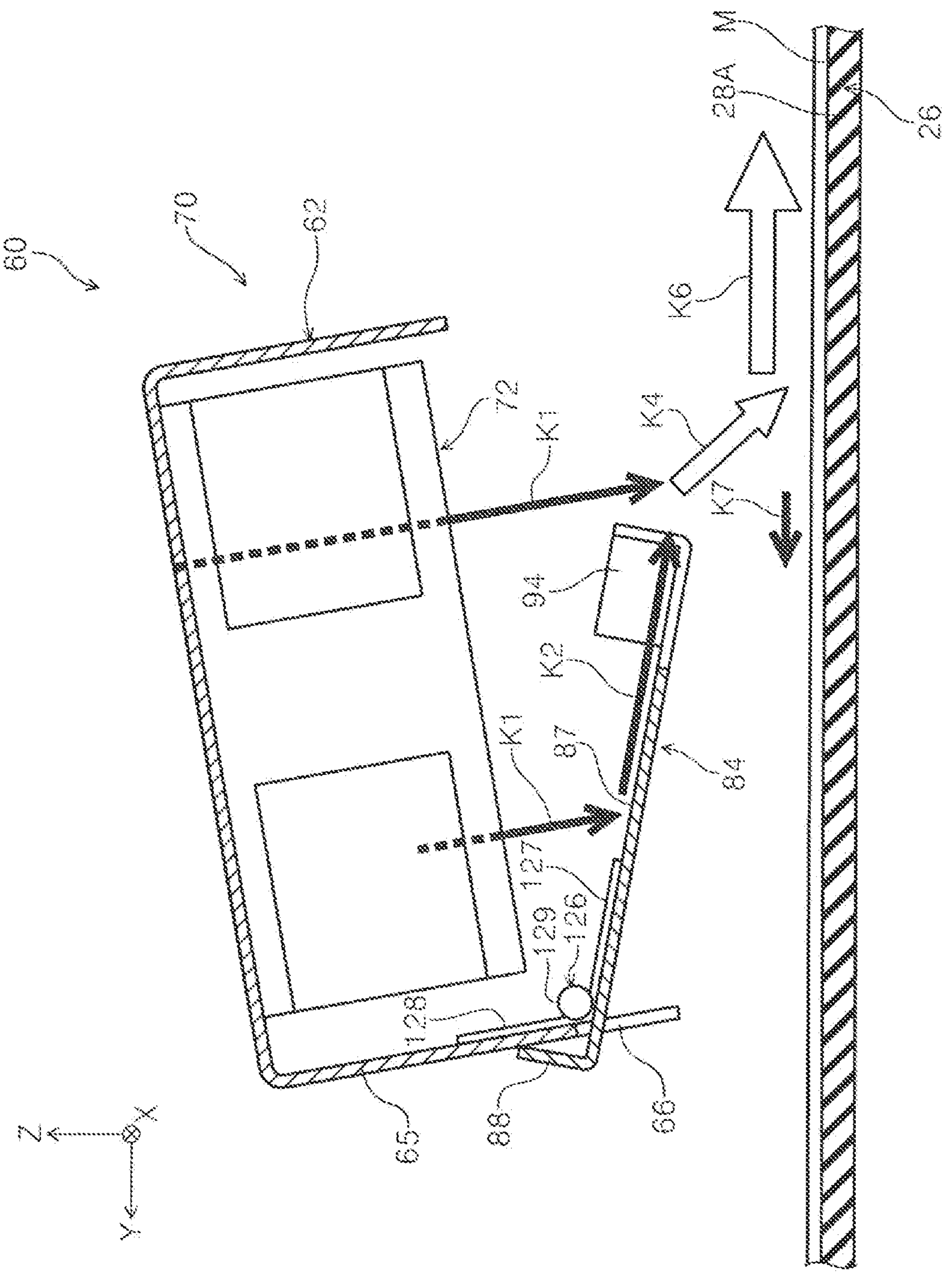
FIG. 9 is a schematic view illustrating an airflow generated in the periphery of a first fan and a first wind deflecting member of an air blowing unit according to an embodiment.

As illustrated in FIG. 9, when viewed in the X direction, the hinge portion 126 includes a shaft portion 129 having a central axis along the X direction, a plate portion 127 extending from the shaft portion 129 along the facing surface 87, and a plate portion 128 extending from the shaft portion 129 along the rear wall 65. The plate portion 127 is fastened to the first wind deflecting member 84. The plate portion 128 is fastened to the rear wall 65.

As the plate portion 127 and the plate portion 128 are relatively rotated about the shaft portion 129, the hinge portion 126 makes it possible to adjust the angle formed by the first wind deflecting member 84 with the rear wall 65.

In the present embodiment, as an example, the side plate portion 88 is located in the +Y direction relative to the rear wall 65 through the notch portion 66 and is brought into contact with the rear wall 65, whereby the inclination of the first wind deflecting member 84 relative to the Y direction is established.

Note that the hinge portion 126 of the second wind deflecting member 104 (FIG. 4) has a similar configuration, and thus the description thereof is omitted.

Comparative Example

Next, an air blowing unit 200 of a comparative example as opposed to the air blowing unit 60 of the present embodiment will be described.

Figure 14:
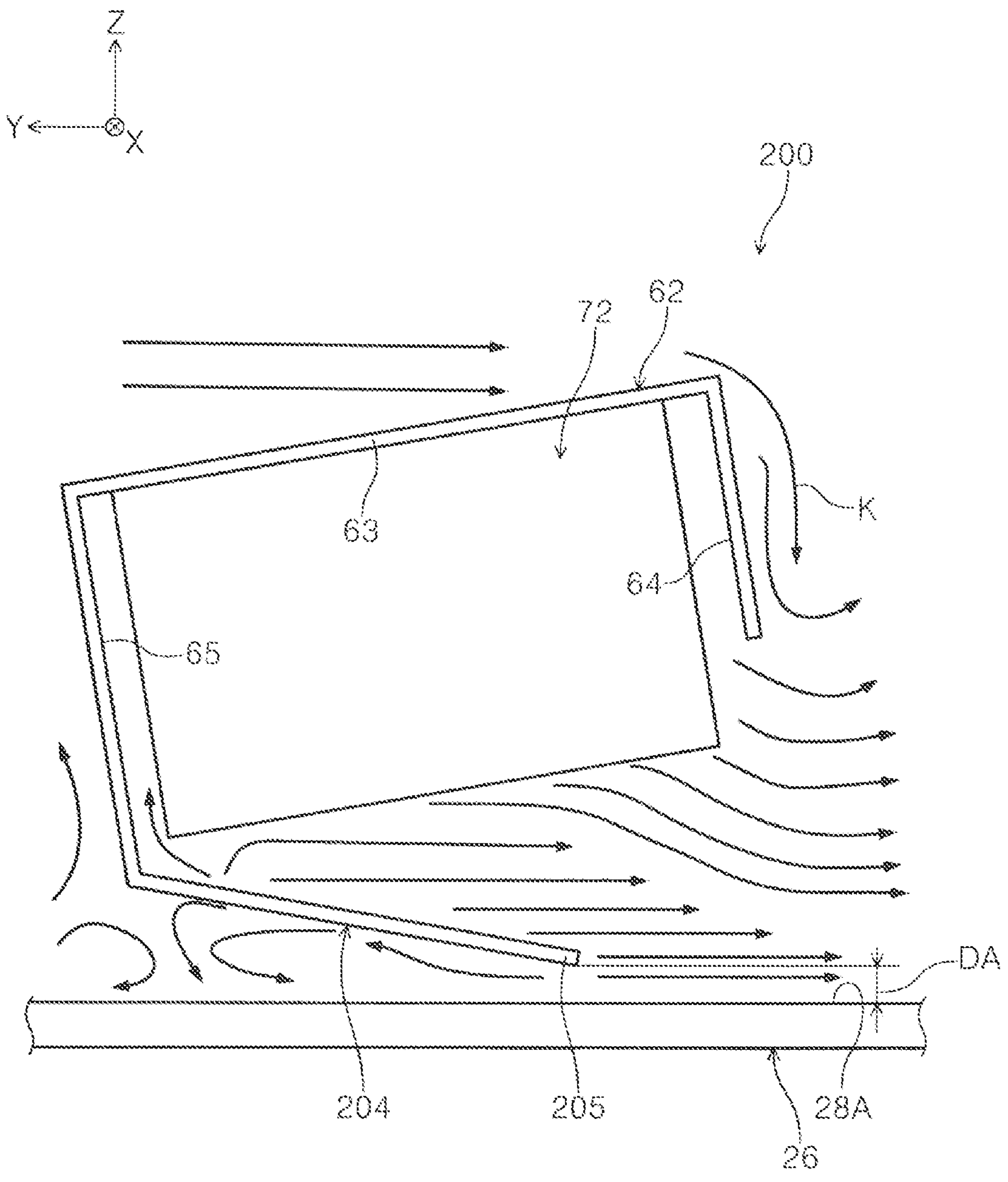
FIG. 14 is a schematic view illustrating a result of simulating a state of an airflow when an air blowing unit according to a comparative example is used in a state of being disposed with a spacing DA.

In FIG. 14, the orientation of an airflow K, which is the result of a simulation of a case in which air blowing is performed in the air blowing unit 200 of the comparative example, is indicated by arrows. Note that each of the arrows represents a general idea, and the length of the arrows does not represent the speed or pressure of the airflow K.

The air blowing unit 200 of the comparative example includes the holding frame 62, the first fan 72, and a facing plate 204.

The facing plate 204 is inclined at an angle similar to that of the first wind deflecting member 84 (FIG. 3) when viewed in the X direction, and faces a portion of the first fan 72 in the Z direction. An end 205 in the −Y direction of the facing plate 204 is not bent. Note that in FIG. 14, the spacing in the direction between the end 205 and the support surface 28A is the spacing DA (mm).

In the case of the spacing DA in the air blowing unit 200 of the comparative example, the airflow K goes approximately toward the −Y direction at positions in the −Y direction relative to the end 205.

On the other hand, at positions that are in the +Y direction relative to the end 205 and that are below the facing plate 204, disturbance in direction is observed in a portion of the airflow K.

Figure 15:
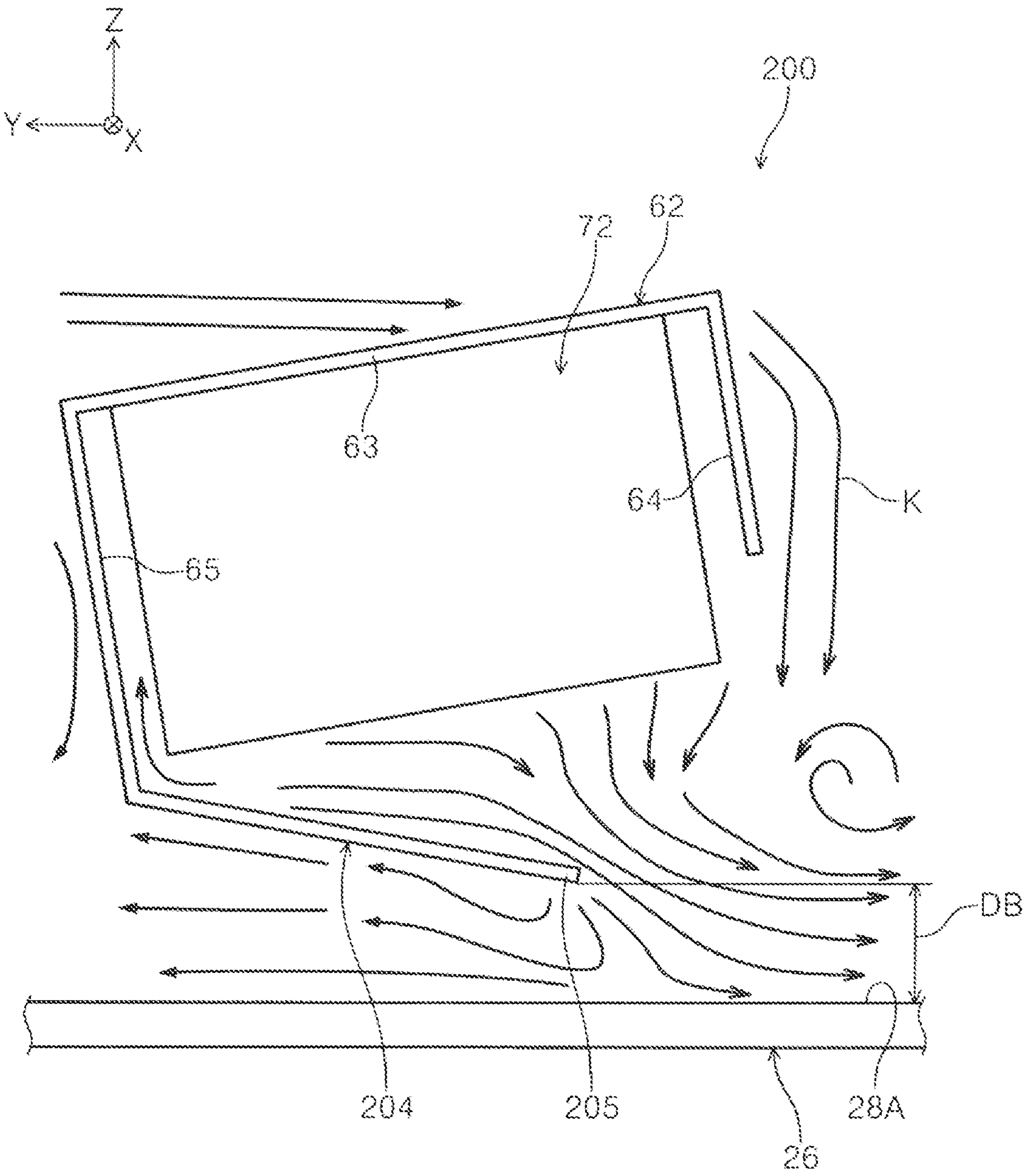
FIG. 15 is a schematic view illustrating a result of simulating a state of an airflow when an air blowing unit according to a comparative example is used in a state of being disposed with a spacing DB.

In FIG. 15, the orientation of the airflow K when, in the air blowing unit 200 of the comparative example, the air blowing unit 200 is moved in the +Z direction and the spacing DB (mm) in the Z direction between the end 205 and the support surface 28A is larger than the spacing DA (FIG. 14) is indicated by arrows.

In the case of the spacing DB, the orientation of the airflow K in the periphery of the end 205 is different from that in the case of the spacing DA. In addition, the state of the airflow K flowing in the +Y direction below the facing plate 204 is different from that in the case of the spacing DA.

In this way, it can be seen that when the air blowing unit 200 of the comparative example is used, the spacing between the facing plate 204 and the support surface 28A changes from the spacing DA to the spacing DB, and thus the likelihood that the orientation or flow rate of the airflow K going toward the ejecting head 32 (FIG. 1) will fluctuate increases.

Action of the Present Embodiment

Next, the action of the printer 10, the transport unit 20, and the air blowing unit 60 of the present embodiment will be described. For each configuration of the printer 10, FIGS. 1 to 6 will be referred to, but individual figure numbers may be omitted.

Note that as described above, the airflow generated from the first fan 72 toward the first wind deflecting member 84 is defined as the airflow K1, and the airflow generated from the second fan 76 toward the second wind deflecting member 104 is defined as the airflow K8.

Figure 7:
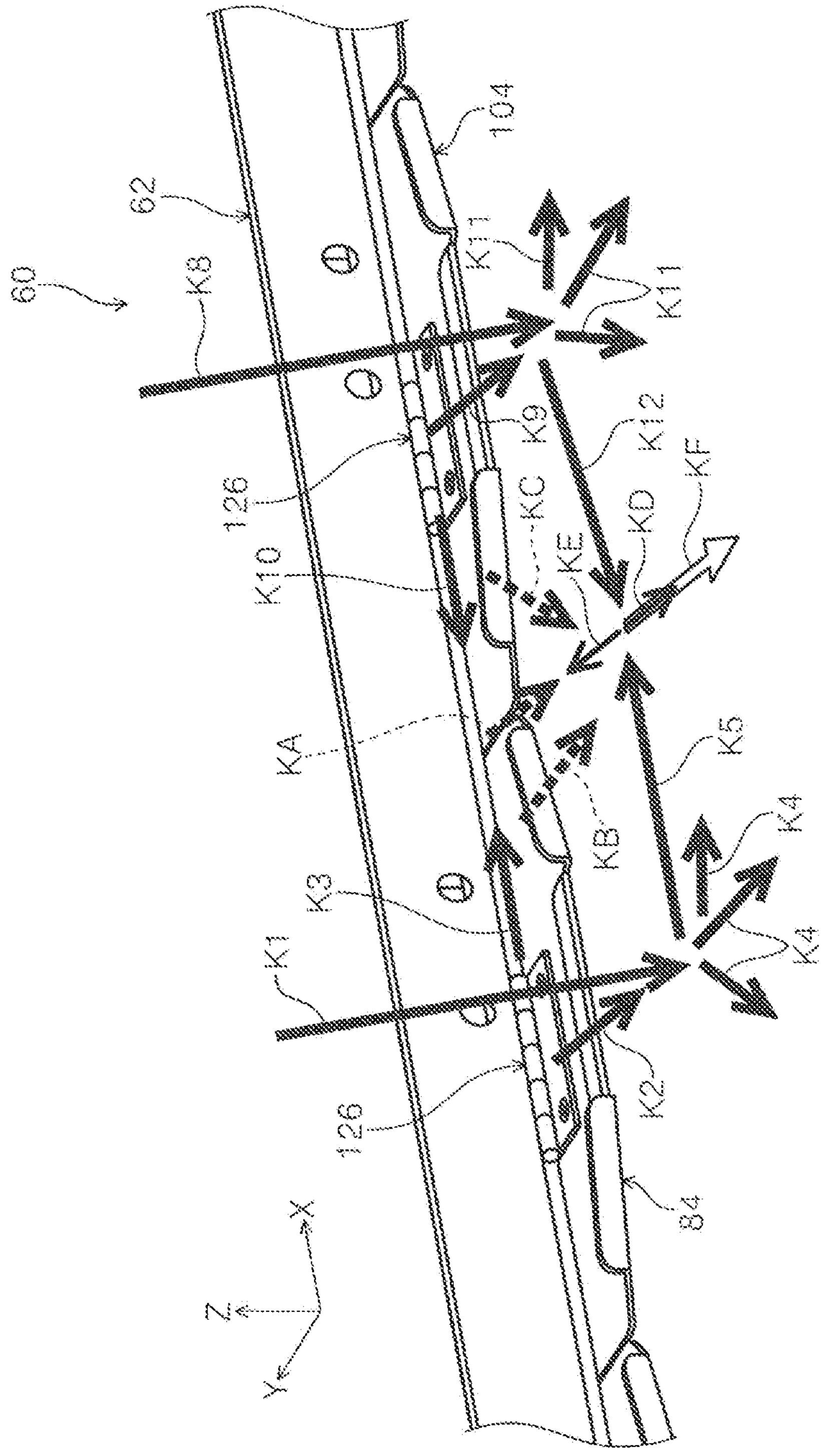
FIG. 7 is a perspective view illustrating an airflow generated in an air blowing unit according to an embodiment.

As illustrated in FIG. 7, generation of the airflow K1 generates an airflow K2 that includes a component going from the first wind deflecting member 84 toward the −Y direction, and an airflow K3 that includes a +X direction component. In the space in which the airflow K1 and the airflow K2 merge, an airflow K4 that includes a −Y direction component and that is diffused, and an airflow K5 that includes a +X direction component are generated.

On the other hand, generation of the airflow K8 generates an airflow K9 that includes a component going from the second wind deflecting member 104 toward the −Y direction, and an airflow K10 that includes a −X direction component. In the space in which the airflow K8 and the airflow K9 merge, an airflow K11 that includes a −Y direction component and that is diffused, and an airflow K12 that includes a −X direction component are generated.

Note that for any airflow located in the −X direction relative to the airflow K1 and any airflow located in the +X direction relative to the airflow K8, the illustration and description thereof are omitted.

Figure 8:
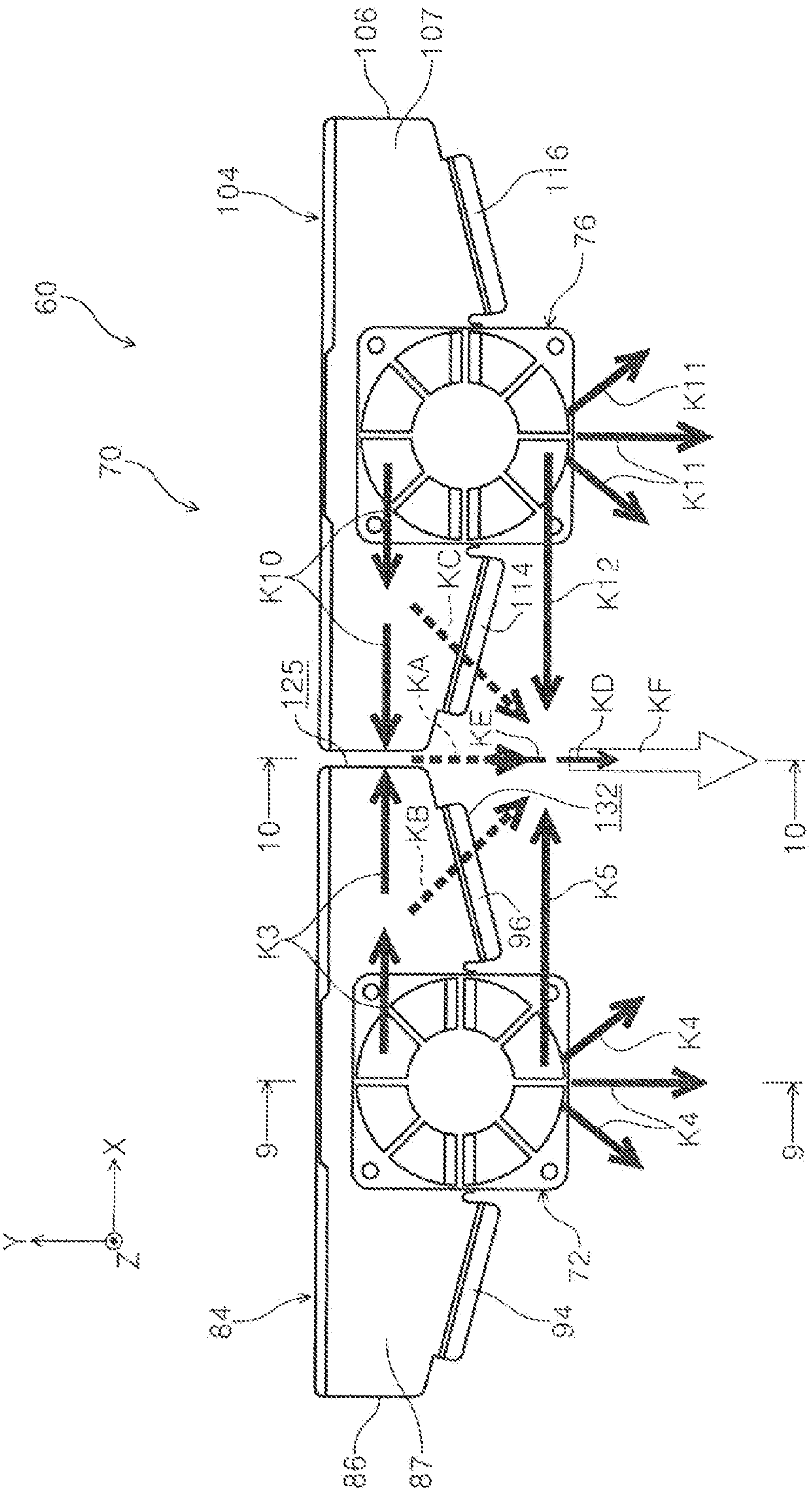
FIG. 8 is a plan view illustrating an airflow generated in an air blowing unit according to an embodiment.

In FIG. 8, the positions in the X direction indicated by the line 9-9 and the line 10-10 are positions in which the airflow K is assumed to easily flow toward the ejecting head 32 (FIG. 1).

In the position indicated by the line 10-10, the airflow K3 and the airflow K10 collide with each other, generating an airflow KA that includes a −Y direction component. Furthermore, the airflow K5 and the airflow K12 collide with each other, generating an airflow KE that includes a +Y direction component and an airflow KD that includes a −Y direction component. Further, a portion of the airflow K3 becomes an airflow KB that goes beyond the first extending portion 96 toward the opening 132. A portion of the airflow K10 becomes an airflow KC that goes beyond the second extending portion 114 toward the opening 132.

Here, the airflow KA, the airflow KB, and the airflow KC are combined with the airflow KD to generate an airflow KF.

On the other hand, at least a portion of one of the airflow KA, the airflow KB, and the airflow KC collides with the airflow KE, whereby the airflow KE is reduced.

As illustrated by the line 9-9 of FIG. 8 and in FIG. 9, in the portion in which the first fan 72 is located in the X direction, the airflow K4 going toward the support surface 28A is the main component. Therefore, the magnitude of the airflow K6 that includes a −Y direction component is larger than the magnitude of the airflow K7 that includes a +Y direction component. In other words, the airflow K7 going toward the ejecting head 32 (FIG. 1) can be reduced.

Figure 10:
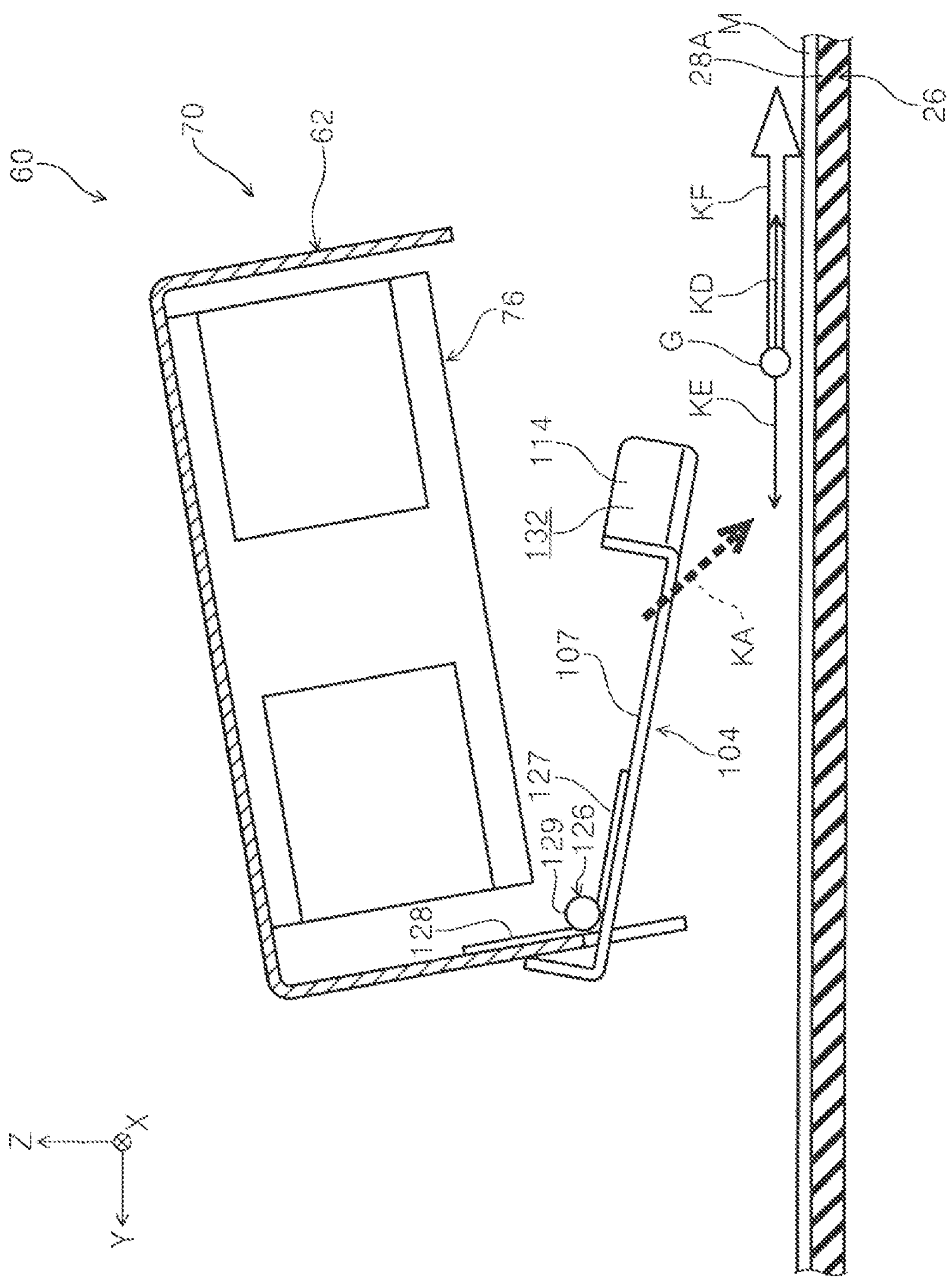
FIG. 10 is a schematic view illustrating an airflow generated in the periphery of an opening of an air blowing unit according to an embodiment.

As illustrated by the line 10-10 of FIG. 8 and in FIG. 10, the airflow KE having a +Y direction component will attempt to flow through the portion in which the opening 132 is located, but a portion of the airflow KA flows toward this airflow KE. In other words, the airflow KE functions as an air curtain. In addition, the airflow KE and the airflow KA collide with each other, whereby the airflow KE is reduced.

Note that although not illustrated, as a comparative example as opposed to the present embodiment, when the second extending portion 114 and the first extending portion 96 are each a straight wall portion extending along the X direction, the merging point of the airflow KA will shift to the −Y direction from the point G illustrated in FIG. 10, and thus the airflow KE is less likely to be reduced.

Figure 11:
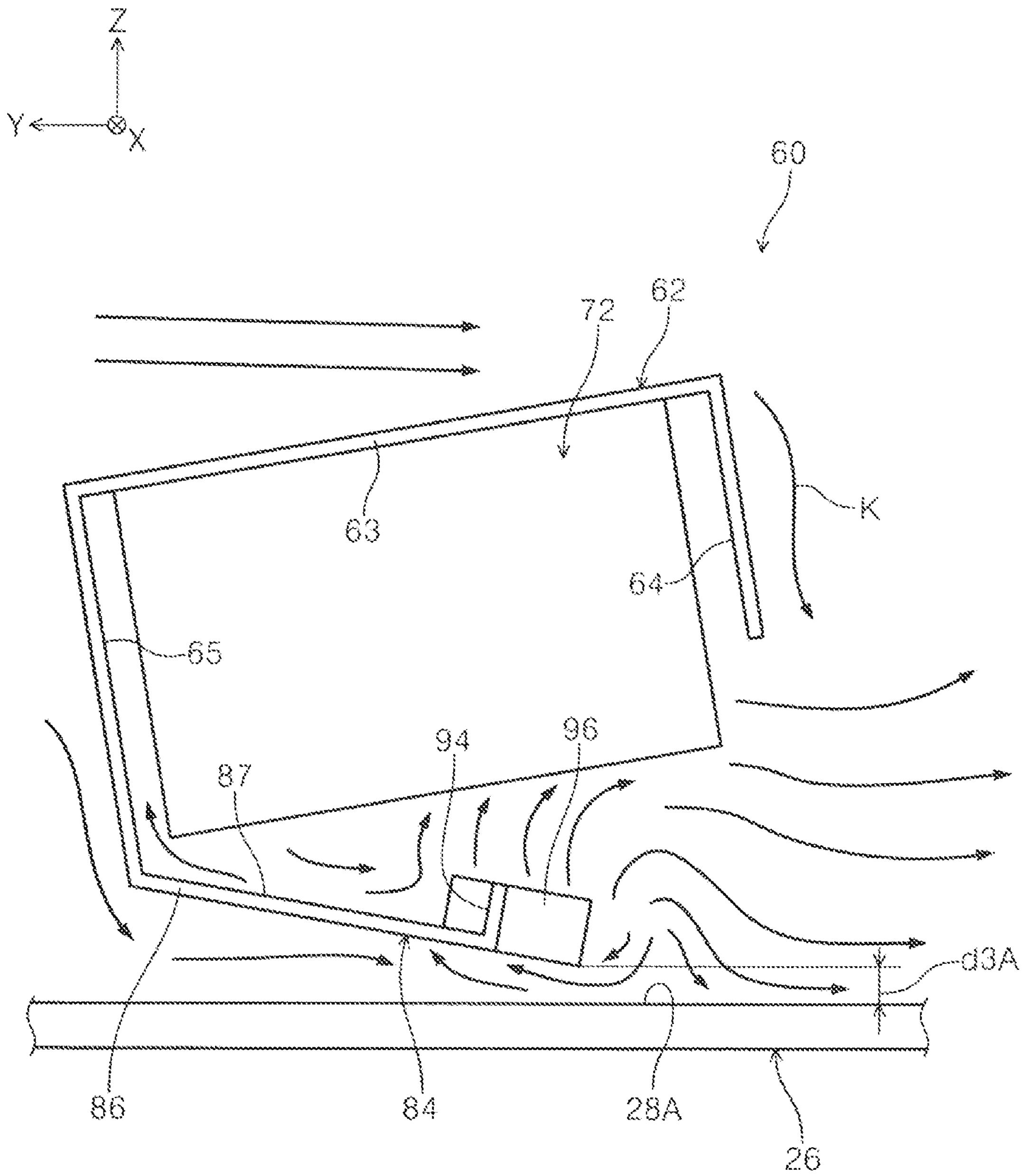
FIG. 11 is a schematic view illustrating a result of simulating a state of an airflow when an air blowing unit according to the present embodiment is used in a state of being disposed with a spacing d3A.

In FIG. 11, the orientation of the airflow K, which is the result of a simulation of a case in which the spacing d3 (FIG. 6) is set to a spacing d3A (mm) in the air blowing unit 60 and air blowing is performed, is indicated by arrows.

Figure 12:
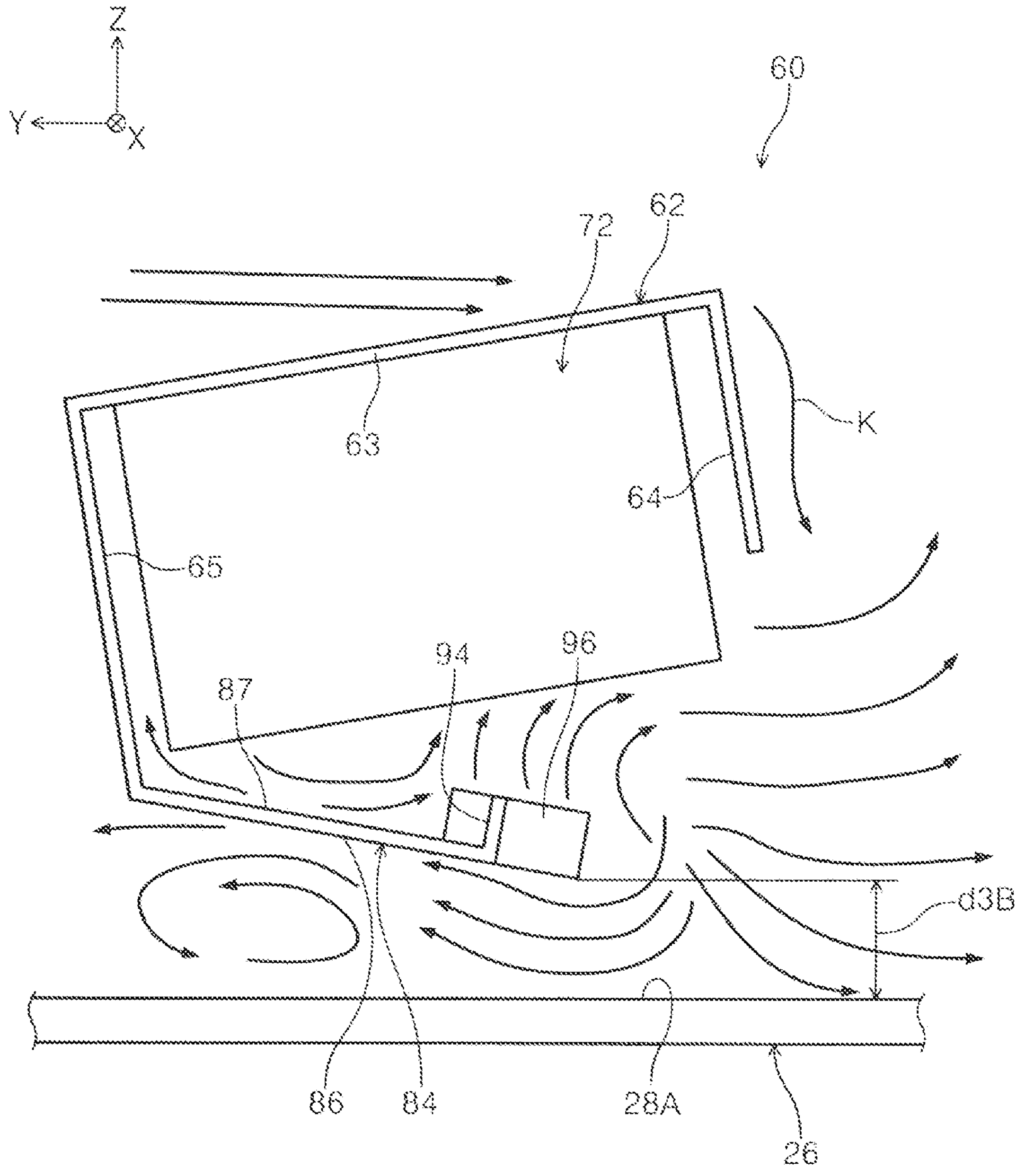
FIG. 12 is a schematic view illustrating a result of simulating a state of an airflow when an air blowing unit according to the present embodiment is used in a state of being disposed with a spacing d3B.

In FIG. 12, the orientation of the airflow K, which is the result of a simulation of a case in which the spacing d3 is set to a spacing d3B (mm) in the air blowing unit 60 and air blowing is performed, is indicated by arrows. The spacing d3B is larger than the spacing d3A. Note that each of the arrows represents a general idea, and the length of the arrows does not represent the speed or pressure of the airflow K.

As illustrated in FIGS. 11 and 12, at a site of the first wind deflecting member 84 in which the second extending portion 94 is provided, the airflow K rises in the +Z direction along the second extending portion 94. In addition, after going beyond the second extending portion 94, the risen airflow K descends in the −Z direction. In this way, since the second extending portion 94 is provided, the airflow K rises and then descends in the periphery of the second extending portion 94. Therefore, compared to a configuration in which the second extending portion 94 is not provided in the first wind deflecting member 84, the flow state of the airflow K in the periphery of the second extending portion 94 is stable. Accordingly, even when the distance between the first wind deflecting member 84 and the support surface 28A or the medium M is changed, the likelihood that the orientation or flow rate of the airflow K going toward the ejecting head 32 (FIG. 1) will fluctuate can be decreased.

Note that for the second wind deflecting member 104, a similar state of the airflow K is also obtained, and thus the illustration and description thereof are omitted.

As illustrated in FIG. 13, a case in which the medium M is placed on the support surface 28A and is being transported will be described. When the pressing roller 42 is reciprocated while being rotated, the medium M receives the pressing force from the pressing roller 42 and the friction force generated between the medium M and the outer circumferential surface of the pressing roller 42. Thus, a small piece MA that is part of the constitutive components is easily peeled off.

The small piece MA is an example of foreign material. In the present embodiment, since the medium M is a fabric, the small piece MA means fluff. In particular, the small piece MA adhering to the medium M before the pressing roller 42 is pressed against thereto is peeled off from the medium M by being pressed by the pressing roller 42, and then is transported in a state of being placed on the medium M by the action of electrostatic force or the like.

Here, in a case in which air blowing is performed toward the medium M in the air blowing unit 60, the small piece MA of the medium M is subjected to wind pressure, and thus is separated from the medium M. That is, the small piece MA is removed.

When the small piece MA is removed by air blowing by the air blowing unit 60, a portion of the airflow K may go toward the downstream in the +Y direction. Here, since the intake unit 50 is provided, the space through which the airflow K on the support surface 28A travels is narrowed and the flow path resistance acting against the airflow K is increased compared to a configuration in which the intake unit 50 is not provided. Thus, the airflow K flowing between the ejecting head 32 and the support surface 28A can be reduced. Accordingly, changes in the flight state of the ink Q ejected from the ejecting head 32 to the medium M can be suppressed.

As described above, according to the printer 10, in a portion in which the first fan 72 and the second fan 76 do not face the facing portion 82 in the Z direction, the airflow K fed from the first fan 72 and the second fan 76 reaches the medium M as is. Accordingly, foreign material such as dust adhering to the medium M can be removed by airflow.

The airflow K that collided with the medium M or the support surface 28A is radially spread from the collision position along the medium M or the support surface 28A. Therefore, a portion of the airflow K that collided with the medium M or the support surface 28A may flow toward the ejecting head 32.

Here, when viewed in the Z direction, the shape of the opening 132 of the facing portion 82 is such that the upstream side in the +Y direction is shaped to be more open in the X direction than the downstream side. Thus, a portion of the airflow K passing through an edge of the opening 132 toward the medium M or the support surface 28A has a direction component intersecting the +Y direction.

Further, on the downstream side in the +Y direction of the opening 132, the opening 132 is narrower in the X direction than on the upstream side in the +Y direction of the opening 132, and thus portions of the airflow K are more likely to collide with each other.

These actions make it possible to cause the airflow K passing through the edge of the opening 132 toward the medium M or the support surface 28A to function as an air curtain. Thus, the airflow K going toward the ejecting head 32 after colliding with the medium M or the support surface 28A can be effectively reduced.

In addition, since the airflow K going toward the ejecting head 32 is reduced, it is possible to suppress changes in the flight state of the ink Q ejected from the ejecting head 32 to the medium M.

According to the printer 10, a portion of each airflow K going from the first fan 72 and the second fan 76 toward the X direction can be efficiently utilized as an air curtain compared to a configuration in which the second ridge portion 118 and the first ridge portion 102 are not within the air blowing range E1 of the first fan 72 and within the air blowing range E2 of the second fan 76 in the +Y direction.

According to the printer 10, the second ridge portion 118 and the first ridge portion 102 are each inclined in the X direction so that the second spacing W2 is larger than the first spacing W1. This makes it possible to continuously reduce the size in the X direction of the opening 132 from upstream to downstream in the +Y direction.

According to the printer 10, a portion of the airflow K along the facing surfaces 87 and 107 collides with the second extending portions 94 and 114 or the first extending portions 96 and 116, and thus goes toward the upper side in the Z direction. In addition, the airflow K going toward the upper side goes beyond the second extending portions 94 and 114 or the first extending portions 96 and 116, and goes toward the lower side in the Z direction. In this way, colliding with the second extending portions 94 and 114 or the first extending portions 96 and 116 causes the direction components of the airflow K to be aligned with the components going toward the lower side in the Z direction. Thus, even when the distance in the Z direction between the facing portion 82 and the medium M is changed, the direction components of the airflow K going toward the medium M can be aligned. In addition, since the direction components of the airflow K going toward the medium M are aligned, it is possible to suppress changes in the flight state of the ink Q ejected from the ejecting head 32 to the medium M.

According to the printer 10, the hinge portions 126 couple the holding frame 62 and the facing portion 82 so that the position of the facing portion 82 relative to the support surface 28A is changeable in accordance with external force. Here, in the operation of setting the medium M on the transport unit 20, when the medium M or the like comes into contact with the facing portion 82, the position of the facing portion 82 relative to the support surface 28A is changed in accordance with acting external force. Accordingly, at least a portion of the facing portion 82 can be retracted from the support surface 28A, that is, the spacing between the facing portion 82 and the support surface 28A can be widened. Thus, workability in the operation of setting the medium M on the transport unit 20 can be enhanced.

According to the printer 10, external force greater than the magnetic force of the permanent magnet acts on the magnets 69. This dismounts the air blowing unit 60 from the frame member 46. Furthermore, the magnetic force of the permanent magnet enables the air blowing unit 60 to be mounted on the frame member 46. In this way, the air blowing unit 60 can be mounted in a simple configuration.

It has been found that when foreign material such as dust adheres to the surface of the medium M, such foreign material is easily separated from the surface after the medium M passed through the reciprocating pressing roller 42.

Here, according to the printer 10, to the medium M that is in a state in which foreign material is easily separated from the surface, air blowing is performed by the air blowing unit 60. Thus, the capability to remove foreign material can be further enhanced.

According to the air blowing unit 60, actions similar to the actions of the printer 10 described above make it possible to cause the airflow K passing through the edge of the opening 132 toward the medium M or the support surface 28A to function as an air curtain. Thus, the airflow K going toward the ejecting head 32 after colliding with the medium M or the support surface 28A can be effectively reduced.

According to the air blowing unit 60, a portion of each airflow K going from the first fan 72 and the second fan 76 toward the X direction can be efficiently utilized as an air curtain compared to a configuration in which the second ridge portion 118 and the first ridge portion 102 are not within the air blowing range E1 of the first fan 72 and within the air blowing range E2 of the second fan 76 in the +Y direction.

According to the air blowing unit 60, the second ridge portion 118 and the first ridge portion 102 are each inclined in the X direction so that the second spacing W2 is larger than the first spacing W1. This makes it possible to continuously reduce the size in the X direction of the opening 132 from upstream to downstream in the +Y direction.

It has been found that when foreign material such as dust adheres to the surface of the medium M, such foreign material is easily separated from the surface of the medium M after the medium M passed through the pressing roller 42 reciprocating in the +Y direction and the −Y direction.

Here, according to the printer 10, to the medium M that is in a state in which the small piece MA is easily separated from the surface, air blowing is performed by the air blowing unit 60. Thus, the capability to remove the small piece MA can be further enhanced.

Further, since the frame member 46 is provided between the air blowing unit 60 and the ejecting head 32 in the +Y direction, the size of the space between the air blowing unit 60 and the ejecting head 32 through which air as an example of gas can flow is smaller than the size of the space in a configuration without the frame member 46. In other words, the magnitude of flow path resistance in the space formed by the support surface 28A and the lower surface 47 is larger than the magnitude of flow path resistance in a configuration without the frame member 46. Accordingly, of the airflow K fed from the air blowing unit 60 to the support surface 28A, the component going toward the downstream in the +Y direction is reduced, that is, the airflow K going toward the ejecting head 32 is reduced. This makes it possible to suppress changes in the flight state of the ink Q ejected from the ejecting head 32 to the medium M.

According to the printer 10, since the intake unit 50 is provided, the spacing between the lower surface 47 and the support surface 28A is narrowed. Accordingly, the flow path resistance against the airflow K flowing downstream in the +Y direction on the support surface 28A further increases, and thus the airflow K going toward the ejecting head 32 can be further reduced.

It has been found that when foreign material such as dust adheres to the surface of the medium M, such foreign material is easily separated from the surface after the medium M passed through the pressing roller 42 reciprocating in the +Y direction and the −Y direction.

Here, according to the transport unit 20, to the medium M that is in a state in which the small piece MA is easily separated from the surface, air blowing is performed by the air blowing unit 60. Thus, the capability to remove the small piece MA can be further enhanced.

Further, since the frame member 46 is provided between the air blowing unit 60 and the ejecting head 32 in the +Y direction, the size of the space between the air blowing unit 60 and the ejecting head 32 through which air as an example of gas can flow is smaller than the size of the space in a configuration without the frame member 46. In other words, the magnitude of flow path resistance in the space formed by the support surface 28A and the lower surface 47 is greater than the magnitude of flow path resistance in a configuration without the frame member 46. Accordingly, of the airflow K fed from the air blowing unit 60 to the support surface 28A, the component going downstream in the +Y direction is reduced, that is, the airflow K going toward the ejecting head 32 is reduced. This makes it possible to suppress changes in the flight state of the ink Q ejected from the ejecting head 32 to the medium M.

The printer 10, the air blowing device 20, and the transport device 24 according to the embodiments of the present disclosure basically have the configurations described above. However, as a matter of course, it is also possible to modify or omit a partial configuration or combine partial configurations without departing from the gist of the present disclosure.

In the printer 10, the air blowing device 25, and the transport device 24, the opening 132 may be provided between base units 70 adjacent to each other in the X direction. That is, the space between the first ridge portion 122 and the second ridge portion 98 may be considered as the opening 132.

The number of base units 70 is not limited to five, and there may be a plurality of them excluding one or five. In other words, the first wind deflecting member 84 may be integrally formed with the second wind deflecting member 104.

The gap 125 need not be formed between the first wind deflecting member 84 and the second wind deflecting member 104. The recessed portions 99, 103, 119, and 123 need not be formed in the first wind deflecting member 84 and the second wind deflecting member 104. Furthermore, the folded-back portions 92 and 112 need not be formed in the first wind deflecting member 84 and the second wind deflecting member 104.

The first ridge portion 102 and the second ridge portion 118 are not limited to inclined straight sites, and may be sites having a curved portion. The opening 132 need not include the first extending portion 96 and the second extending portion 114.

A latch mechanism may be provided in place of the hinge portions 126 to allow the position of the facing portion 82 relative to the support surface 28A to be changed.

The frame member 46 need not be formed of a material having ferromagnetic properties. In this configuration, the air blowing unit 60 may be mounted on the frame member 46 using bolts, nuts, and the like without using the magnets 69 as mounting portions. The magnets 69 may be provided in a number other than five.

A pressing pad may be used in place of the pressing roller 42. The medium M may be a sheet.

Removal of the small piece MA may be performed by providing a recovery unit configured to recover the small piece MA using electrostatic force.

The intake unit 50 need not be provided between the lower surface 47 and the support surface 28A. Furthermore, another unit or another member may be provided in place of the intake unit 50.

What is claimed is:

1. A liquid ejecting device comprising:

an ejecting unit configured to eject liquid to a medium to be transported;

a support portion including a support surface configured to support the medium; and an air blowing portion configured to blow air to the medium upstream of the ejecting unit in a transport direction of the medium; wherein the air blowing portion includes a first fan configured to blow air toward the support surface, a second fan that is aligned with the first fan in a width direction intersecting the transport direction and that is configured to blow air toward the support surface, a first facing member that faces the support surface in a height direction intersecting the transport direction and the width direction and that faces a portion of the first fan in the height direction, and a second facing member that faces the support surface in the height direction and that faces a portion of the second fan in the height direction, wherein the second facing member is aligned with the first facing member in the width direction, the first facing member and the second facing member include an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

2. The liquid ejecting device according to claim 1, wherein the opening includes a first ridge portion and a second ridge portion that face each other in the width direction and that form at least a portion of the opening, the first ridge portion is located within an air blowing range of the first fan in the transport direction when viewed in the height direction, and the second ridge portion is located within an air blowing range of the second fan in the transport direction when viewed in the height direction.

3. The liquid ejecting device according to claim 2, wherein the first ridge portion and the second ridge portion are each inclined with respect to the width direction so that the second spacing is larger than the first spacing.

4. The liquid ejecting device according to claim 2, wherein the first facing member includes a first facing surface facing the first fan, the second facing member includes a second facing surface facing the second fan, when a direction that intersects the first facing surface and the direction from the first facing member toward the first fan is defined as a first direction, the first facing member is provided with a first extending portion extending from the first ridge portion in the first direction when a direction that intersects the second facing surface and the direction from the second facing member toward the second fan is defined as a second direction, the second facing member is provided with a second extending portion extending from the second ridge portion in the second direction.

5. The liquid ejecting device according to claim 1, wherein the air blowing portion includes a holding portion configured to hold both the first fan and the second fan and the liquid ejecting device comprises a coupling portion configured to couple the holding portion and the facing member so that a position of the facing member relative to the support surface is changeable in accordance with external force.

6. The liquid ejecting device according to claim 1, comprising:

a frame member that is formed of a material having ferromagnetic properties and that is configured to support the ejecting unit; wherein the air blowing portion includes a mounting portion including a permanent magnet, and is attachable to and detachable from the frame member by magnetic force of the permanent magnet.

7. The liquid ejecting device according to claim 1, wherein the support portion includes a plurality of rollers that is configured to rotate, and a transport belt that includes the support surface and that is wound around the plurality of rollers, a pressing roller configured to press the medium against the support surface is provided upstream of the ejecting unit in the transport direction, the pressing roller is configured to reciprocate in the transport direction and in a reverse transport direction opposite to the transport direction, and the air blowing portion is provided downstream of the pressing roller and upstream of the ejecting unit in the transport direction.

8. An air blowing device comprising:

a support portion including a support surface configured to support a medium; and an air blowing portion configured to blow air to the medium upstream of an ejecting unit configured to eject liquid to the medium in a transport direction of the medium; wherein the air blowing portion includes a first fan configured to blow air toward the support surface, a second fan that is aligned with the first fan in a width direction intersecting the transport direction and that is configured to blow air toward the support surface, and a facing member that faces the support surface in a height direction intersecting the transport direction and the width direction and that faces a portion of the first fan and a portion of the second fan in the height direction, the facing member includes an opening that opens in the height direction, the opening is located between the first fan and the second fan in the width direction when viewed in the height direction, and when a spacing in the width direction of the opening at a first position in the transport direction is a first spacing and a spacing in the width direction of the opening at a second position upstream of the first position in the transport direction is a second spacing, the second spacing is larger than the first spacing.

9. The air blowing device according to claim 8, wherein the opening includes a first ridge portion and a second ridge portion that face each other in the width direction and that form at least a portion of the opening, the first ridge portion is located within an air blowing range of the first fan in the transport direction when viewed in the height direction, and the second ridge portion is located within an air blowing range of the second fan in the transport direction when viewed in the height direction.

10. The air blowing device according to claim 9, wherein the first ridge portion and the second ridge portion are each inclined with respect to the width direction so that the second spacing is larger than the first spacing.

* * * * *